United States Patent
Miyamoto

(10) Patent No.: US 9,483,324 B2
(45) Date of Patent: Nov. 1, 2016

(54) PROGRAM CONVERSION DEVICE AND METHOD, PROCESS SWITCHING METHOD, METHOD OF DETERMINING EXECUTION SCHEME AND PROGRAM STORAGE MEDIUM THEREFOR, PROCESSOR SYSTEM, AND PARALLEL EXECUTION SCHEME

(71) Applicant: NEC Corporation, Minato-ku, Tokyo (JP)

(72) Inventor: Takamichi Miyamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/411,256

(22) PCT Filed: Jun. 12, 2013

(86) PCT No.: PCT/JP2013/003684
§ 371 (c)(1),
(2) Date: Dec. 24, 2014

(87) PCT Pub. No.: WO2014/002412
PCT Pub. Date: Jan. 3, 2014

(65) Prior Publication Data
US 2015/0205643 A1 Jul. 23, 2015

(30) Foreign Application Priority Data
Jun. 26, 2012 (JP) ................. 2012-142901

(51) Int. Cl.
*G06F 9/46* (2006.01)
*G06F 9/52* (2006.01)
(Continued)

(52) U.S. Cl.
CPC . *G06F 9/52* (2013.01); *G06F 8/52* (2013.01); *G06F 9/5011* (2013.01)

(58) Field of Classification Search
CPC .......................................................... G06F 9/52
USPC ....................................................... 718/1–108
See application file for complete search history.

(56) References Cited

U.S. PATENT DOCUMENTS

| | | | | |
|---|---|---|---|---|
| 6,535,971 B1* | 3/2003 | Shirasawa | ................. | G06T 1/20 |
| | | | | 712/228 |
| 6,873,928 B2* | 3/2005 | Thurman | ................. | G06F 8/71 |
| | | | | 702/123 |

(Continued)

FOREIGN PATENT DOCUMENTS

| | | |
|---|---|---|
| JP | 1998-289116 A | 10/1998 |
| JP | 2007-316710 A | 12/2007 |
| JP | 2011-204209 A | 10/2011 |

OTHER PUBLICATIONS

Liu, Chang, En Ye, and Debra J. Richardson. "Software library usage pattern extraction using a software model checker." Automated Software Engineering, 2006. ASE'06. 21st IEEE/ACM International Conference on. IEEE, 2006, pp. 1-4.*

(Continued)

*Primary Examiner* — Satish Rampuria

(57) ABSTRACT

Provided is to a program conversion device which can use processor resources of a system to the utmost and enhance performance ability. The program conversion device includes: specific process determining unit which determines a range of a partial program to perform a specific process in a target program which includes a first execution scheme specifying program which can be executed in parallel with a first ratio of being a usage ratio of a first usage quantity with respect to a first resource of a first processor and a second usage quantity with respect to a second resource of a second processor; and process converting unit which converts the partial program into a second execution scheme specifying program which can be executed in parallel with a second ratio of being the usage ratio different from the first ratio.

14 Claims, 19 Drawing Sheets

(51) Int. Cl.
*G06F 9/50* (2006.01)
*G06F 9/45* (2006.01)

(56) References Cited

U.S. PATENT DOCUMENTS

| | | | |
|---|---|---|---|
| 7,406,688 B2* | 7/2008 | Shibayama | G06F 9/5066 718/101 |
| 7,672,236 B1* | 3/2010 | Karunakaran | H04L 12/4625 370/230.1 |
| 7,761,877 B2* | 7/2010 | Li | G06F 8/45 712/1 |
| 2010/0287540 A1* | 11/2010 | Takai | G06F 9/45512 717/137 |
| 2012/0154412 A1 | 6/2012 | Harney et al. | |
| 2014/0082614 A1* | 3/2014 | Klein | G06F 9/45558 718/1 |

OTHER PUBLICATIONS

Darlington, John, et al. "Parallel programming using skeleton functions." PARLE'93 Parallel Architectures and Languages Europe. Springer Berlin Heidelberg, 1993, pp. 146-160.*

Kiwior, Diane, and Stephen Zabele. "Active resource allocation in active networks." Selected Areas in Communications, IEEE Journal on 19.3 (2001): pp. 452-459.*

International Search Report for PCT Application No. PCT/JP2013/003684, mailed on Jul. 9, 2013.

* cited by examiner

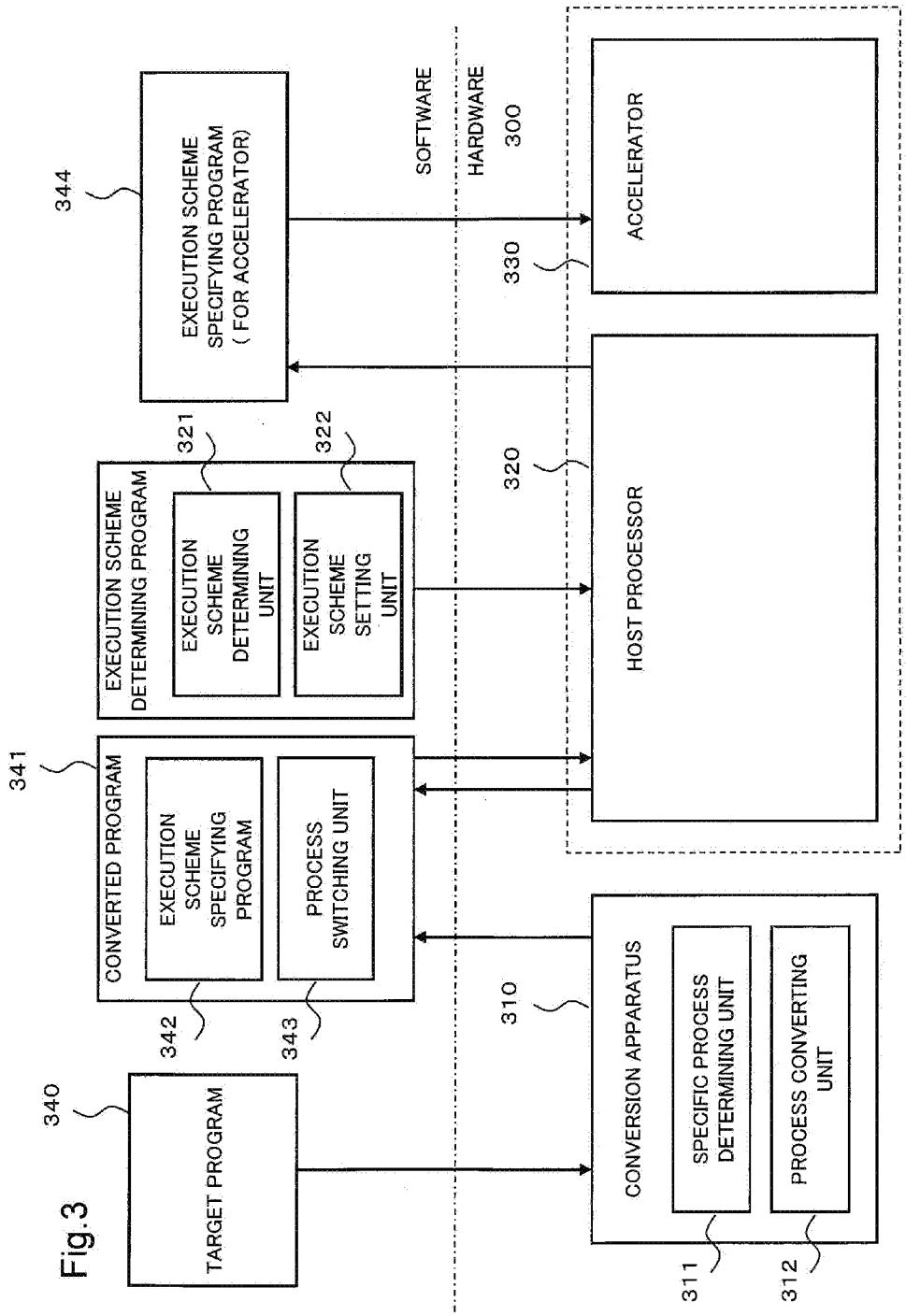

Fig.4

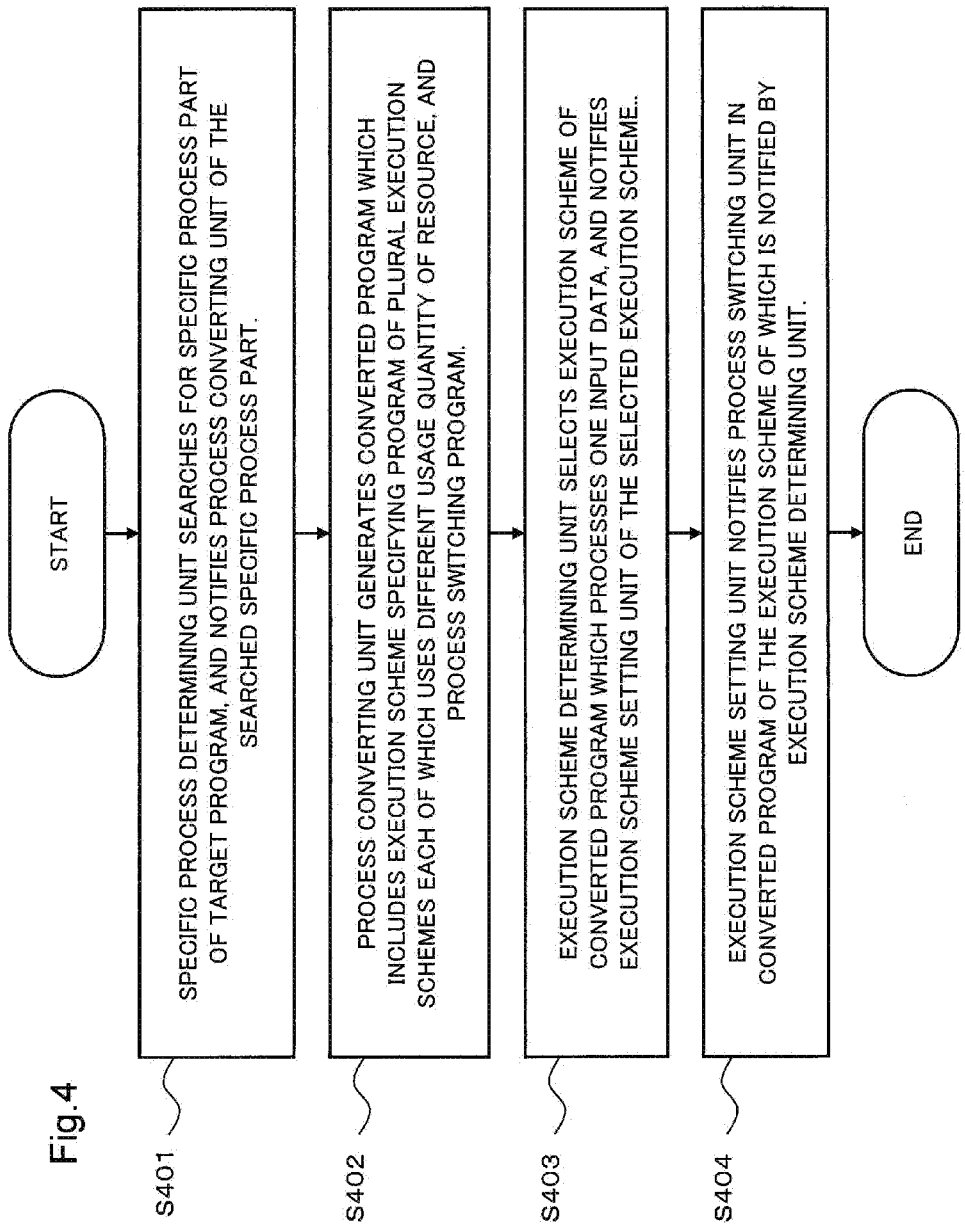

S401: SPECIFIC PROCESS DETERMINING UNIT SEARCHES FOR SPECIFIC PROCESS PART OF TARGET PROGRAM, AND NOTIFIES PROCESS CONVERTING UNIT OF THE SEARCHED SPECIFIC PROCESS PART.

S402: PROCESS CONVERTING UNIT GENERATES CONVERTED PROGRAM WHICH INCLUDES EXECUTION SCHEME SPECIFYING PROGRAM OF PLURAL EXECUTION SCHEMES EACH OF WHICH USES DIFFERENT USAGE QUANTITY OF RESOURCE, AND PROCESS SWITCHING PROGRAM.

S403: EXECUTION SCHEME DETERMINING UNIT SELECTS EXECUTION SCHEME OF CONVERTED PROGRAM WHICH PROCESSES ONE INPUT DATA, AND NOTIFIES EXECUTION SCHEME SETTING UNIT OF THE SELECTED EXECUTION SCHEME.

S404: EXECUTION SCHEME SETTING UNIT NOTIFIES PROCESS SWITCHING UNIT IN CONVERTED PROGRAM OF THE EXECUTION SCHEME OF WHICH IS NOTIFIED BY EXECUTION SCHEME DETERMINING UNIT.

Fig.12

| RESULT NUMBER | EXECUTION SCHEME 1 | EXECUTION SCHEME 2 | EXECUTION SCHEME 3 | PERFORMANCE RESULT |
|---|---|---|---|---|
| 0(INITIAL VALUE) | 15 | 0 | 0 | 150 |
| 1 | 16 | 0 | 0 | 160 |
| .. | .. | .. | .. | .. |
| 5 | 20 | 0 | 0 | 200 |
| 6 | 21 | 0 | 0 | 190 |
| 7 | 20 | 1 | 0 | 180 |
| 8 | 20 | 0 | 1 | 205 |
| .. | .. | .. | .. | .. |
| 26 | 20 | 0 | 18 | 290 |
| 27 | 20 | 0 | 18 | 285 |

PROGRAM CONVERSION DEVICE AND METHOD, PROCESS SWITCHING METHOD, METHOD OF DETERMINING EXECUTION SCHEME AND PROGRAM STORAGE MEDIUM THEREFOR, PROCESSOR SYSTEM, AND PARALLEL EXECUTION SCHEME

REFERENCE TO RELATED APPLICATION

The present application is a National Stage Entry of: PCT/JP2013/003684 filed Jun. 12, 2013, which is based on and claims the benefit of the priority of Japanese Patent Application No. 2012-142901, filed on Jun. 26, 2012, the disclosures of all of which are incorporated herein in their entirety by reference.

TECHNICAL FIELD

The present invention relates to a program conversion device, a program converting method, a process switching method, an execution scheme determining method, a program, a processor system and a parallel execution scheme which, in a processor system including a main processor and a sub processor, make the sub processor execute a portion of a program executed by the main processor.

BACKGROUND ART

A server system, which includes a main processor and a sub processor such as General Purpose Graphic Processing Units (GPGPU), is prevailing. The server system is used frequently in order to realize high performance, that is, to make an execution time (hereinafter, called 'latency'), in which a program is executed to process single input data or a set of input data corresponding to an unit of process target, shortened.

In order to make latency of the program shortened in the system, a scheme (method) to make the sub processor execute one or more partial programs, which are included in a main processor program, is used in some cases (the scheme is called 'offload scheme'). A program, which is intended to be executed by the main processor, is called 'main program'. A portion of the main program (partial program), which is executed by the sub processor according to the offload scheme, is called 'offload part' or 'offload program'. That the main processor makes the sub processor execute a program is called 'offloading'. That the main processor designates a program to offload, that is, the main processor designates an offload part is called 'offload-designating'.

In general, 'offload scheme' is realized by carrying out the following three procedures.

1) A main processor transfers data to a sub processor to make the sub processor execute an offload part. A program code of the offload part is transferred simultaneously at this time, or is stored in advance in a predetermined storage apparatus as a sub processor program.

2) The sub processor executes the offload part.

3) The sub processor transfers a result of executing the offload part to the main processor.

In order to shorten latency of being time to execute the whole program by the offload scheme, latency of the offload part, which is executed by the sub processor, is shorter than one which is executed by the main processor. In general, a range of the offload part included in the main program is designated by a person who develops the main program (hereinafter, simply called 'program developing person').

In order to shorten the latency, the program developing person determines the offload part in consideration of a latency shortening effect which is acquired by using the sub processor, and a time which is required for transferring data.

In many cases, the program developing person designates the offload part of the main program by embedding an instruction statement, which designates a range of the offload part and the data to be transferred, in the main program. In order to designate the data to be transferred, the program developing person must analyze data which the sub processor requires to process the offload part, and data which the sub processor transfers to the main processor after processing the offload part. Since such the data analysis is difficult in general, it is difficult that the program developing person designates a desired range of the main program as the offload part. However, there is a process, in which analysis on the data to be transferred is easy, such as an input process which receives data to execute the program, and an output process which outputs a result of executing the program.

On the other hand, in the case that parallel processes are carried out by executing a plurality of programs simultaneously for a plurality of input data with the offload scheme, not only the latency but also a large amount of data (hereinafter, called 'throughput') to be processed per an unit time are required in the system. In order to acquire high throughput, it is important to use resources of the main processor and the sub processor efficiently. However, in order to use the resources of the processor with thorough efficiency, it is mandatory that a ratio of quantity of the resource per the processor which is used by the program coincides with a ratio of quantity of available resource per the processor. Therefore, even if a plurality of processors execute a program, which is created in non-consideration of the parallel operation, at the same time, it is impossible to use the resource efficiently. Accordingly, it is impossible to acquire high throughput even if carrying out the parallel operation to such the program.

FIG. 19 shows an example of the parallel operation which causes a problem that a resource of a processor is left and consequently it is impossible to acquire high throughput. According to the example, a host processor and an accelerator, which supports processes of the host processor as the sub processor, are arranged. It is assumed that quantity of resource of the accelerator is larger than one of the host processor.

In order to execute a partial program which is designated as the offload part, both of the resource of the host processor and the resource of the accelerator are required. That is, when executing the offload part for one input data, the resource of the host processor and the resource of the accelerator are used with the same quantity each. Then, if a difference in the quantity of the resource between the host processor and the accelerator exists, the following problem is caused. When executing a program, which uses the resource of the host processor and the resource of the accelerator with the same quantity each, for a plurality of input data, the resource of the host processor cannot be used any more, and the resource of the accelerator is left. As mentioned above, the problem that, while the resource of the accelerator is left, the program cannot be executed for input data whose number is not smaller than number of the input data which are being processed at this time is caused.

In general, when executing a plurality of programs, each of which includes an offload part, in parallel, it is not easy to use the processor resource effectively. Therefore, various kinds of arts are disclosed with respect to selection of the offload part, and allotment of the processor resource to the program.

There is a method to determine which processor should execute respectively loops included in input software (for example, refer to a patent literature 1). In the art which is described in the patent literature 1, a time for transferring data to the accelerator is measured, and a win-loss table, which indicates superiority-inferiority between execution times of the host processor and the accelerator, is generated. Then, a loop which is an offload target is determined based on the win-loss table, and the input software is converted so that the loop may be offloaded.

Moreover, there is a method to allot the processor resource to each of plural programs by a classification of the program (for example, refer to a patent literature 2). In the art which is described in the patent literature 2, a real time program and a non-real time program are separated and these are allotted to the resource, and consequently a system can execute a plurality of programs without one program's occupying all the resource.

CITATION LIST

Patent Literature

[PTL 1] Japanese Patent Application Laid-Open Publication No. 2011-204209
[PTL 2] Japanese Patent Application Laid-Open Publication No. H10(1998)-289116

SUMMARY OF INVENTION

Technical Problem

In the art which is disclosed in the patent literature 1, a loop whose offloading can bring an effect is detected, and software is converted so that the detected loop may be offloaded. However, in the general purpose processor and the accelerator, the quantity of resource which are required to processing the loop and the quantity of resource which is available at the point of time are not taken into consideration. Therefore, there is a possibility that the problem that the resource of the accelerator is left, and the problem that it is impossible to carry out offloading due to shortage of the resource may be caused. Accordingly, even in the case that the system includes the resource which has more superior process ability, the system cannot utilize the resource.

In the art which is disclosed in the patent literature 2, the system can execute a plurality of programs without one program's occupying all the resources. In the art of the patent literature 2, while it is assumed that there are a plurality of programs which belong to different classification, it is not assumed that one common program is executed in parallel for a plurality of inputs. Accordingly, even if resource of the processor is left, it is impossible that the system executes one program in parallel by separating the resources.

Object of the Invention

The present invention has been conceived in consideration of the above-mentioned technical problem. A main object of the present invention is to provide a program conversion device, a program converting method, a process switching method, an execution scheme determining method, a program storage medium, a processor system and a parallel execution scheme which are able to use a resource of a processor included in a system, and to make a process ability enhanced.

Solution to Problem

A program conversion device of the present invention includes a specific process determining unit which determines a range of a partial program to perform a specific process in a target program which includes a first execution scheme specifying program which can be executed in parallel with a first ratio of being a usage ratio of a first usage quantity with respect to a first resource of a first processor and a second usage quantity with respect to a second resource of a second processor; and
a process converting unit which converts the partial program into a second execution scheme specifying program in which the first processor and the second processor operate simultaneously with a second ratio of being the usage ratio different from the first ratio and generating a converted program.

A program converting method of the present invention includes
determining a range of a partial program to perform a specific process in a target program which includes a first execution scheme specifying program which can be executed in parallel with a first ratio of being a usage ratio of a first usage quantity with respect to a first resource of a first processor and a second usage quantity with respect to a second resource of a second processor; and
converting the partial program into a second execution scheme specifying program which can be executed in parallel with a second ratio of being the usage ratio different from the first ratio.

A process switching method of the present invention includes
switching from a first process unit to a second process unit and vice versa based on a command from outside,
wherein the first process unit operates based on a first execution scheme which can be executed in parallel with a first ratio of being a usage ratio of a first usage quantity with respect to a first resource of a first processor and a second usage quantity with respect to a second resource of a second processor, and the second process unit operates based on a second execution scheme which can be executed in parallel with a second ratio of being the usage ratio different from the first ratio.

A non-transitory storage medium of the present invention, the storage medium stores an execution scheme determining program which makes a first processor operate as
a first process unit which operates based on a first execution scheme which can be executed in parallel with a first ratio of being a usage ratio of a first usage quantity with respect to a first resource of a first processor and a second usage quantity with respect to a second resource of a second processor,
a second process unit which operates based on a second execution scheme which can be executed in parallel with a second ratio of being the usage ratio different from the first ratio, and
a process switch unit which switches from the first process unit to the second process unit and vice versa based on a command from outside.

A method of determining execution scheme of the present invention includes
selecting any one of a first execution scheme which can be executed in parallel with a first ratio of being a usage ratio of a first usage quantity with respect to a first resource of a first processor and a second usage quantity with respect to a second resource of a second processor, and a second execution scheme which can be executed in parallel with a second ratio of being the usage ratio different from the first ratio; and setting the first execution scheme or the second execution scheme based on the selection result.

A non-transitory storage medium of the present invention, the storage medium stores a program which makes a first processor operate as a execution scheme determining unit which selects, as execution scheme to executing a specific program, any one of a first execution scheme which can be executed in parallel with a first ratio of being a usage ratio of a first usage quantity with respect to a first resource of a first processor and a second usage quantity with respect to a second resource of a second processor, and a second execution scheme which can be executed in parallel with a second ratio of being the usage ratio different from the first ratio, and a execution scheme setting unit which sets the first execution scheme or the second execution scheme based on the selection result.

A processor system of the present invention includes
a first processor which includes a first resource; and
a second processor which includes a second resource,
wherein the first processor operates as a process switch unit which switches from a first process unit to a second process unit and vice versa based on a command from outside, the first process unit operates based on a first execution scheme which can be executed in parallel with a first ratio of being a usage ratio of a first usage quantity with respect to a first resource of a first processor and a second usage quantity with respect to a second resource of a second processor, and the second process unit operates based on a second execution scheme which can be executed in parallel with a second ratio of being the usage ratio different from the first ratio, and a first partial process unit which utilizes the first resource of the first process unit and the second process unit.

A parallel execution method of the present invention includes by a first processor, switching from a first process unit to a second process unit and vice versa based on a command from outside, the first process unit operates based on a first execution scheme which can be executed in parallel with a first ratio of being a usage ratio of a first usage quantity with respect to a first resource of a first processor and a second usage quantity with respect to a second resource of a second processor, and the second process unit operates based on a second execution scheme which can be executed in parallel with a second ratio of being the usage ratio different from the first ratio, and operating as a first partial process unit which utilizes the first resource of the first process unit and the second process unit; and by the second processor, operating as a second partial process unit which utilizes the second resource of the first process unit and the second process unit.

Advantageous Effects of Invention

According to the present invention, a system can execute one kind of program with plural execution schemes which are different each other in a usage ratio of processor resource per a processor and can be performed parallel. Therefore, even in the case of executing one kind of program in parallel, it is possible to use the processor resource efficiently. Accordingly, the system which adopts the present invention can use the resource of the system efficiently and can enhance process ability.

BRIEF DESCRIPTION OF DRAWINGS

FIG. 3 is a block diagram showing a configuration of a program executing system in the first exemplary embodiment of the present invention.

FIG. 4 is a flowchart showing an operation of a parallel process control system in the first exemplary embodiment of the present invention.

FIG. 12 is a diagram showing an example of a management table which describes a performance measurement result in the sixth exemplary embodiment of the present invention.

DESCRIPTION OF EMBODIMENTS

<First Exemplary Embodiment>

Hereinafter, a first exemplary embodiment according to the present invention will be described in detail with reference to a drawing.

Figure 1:
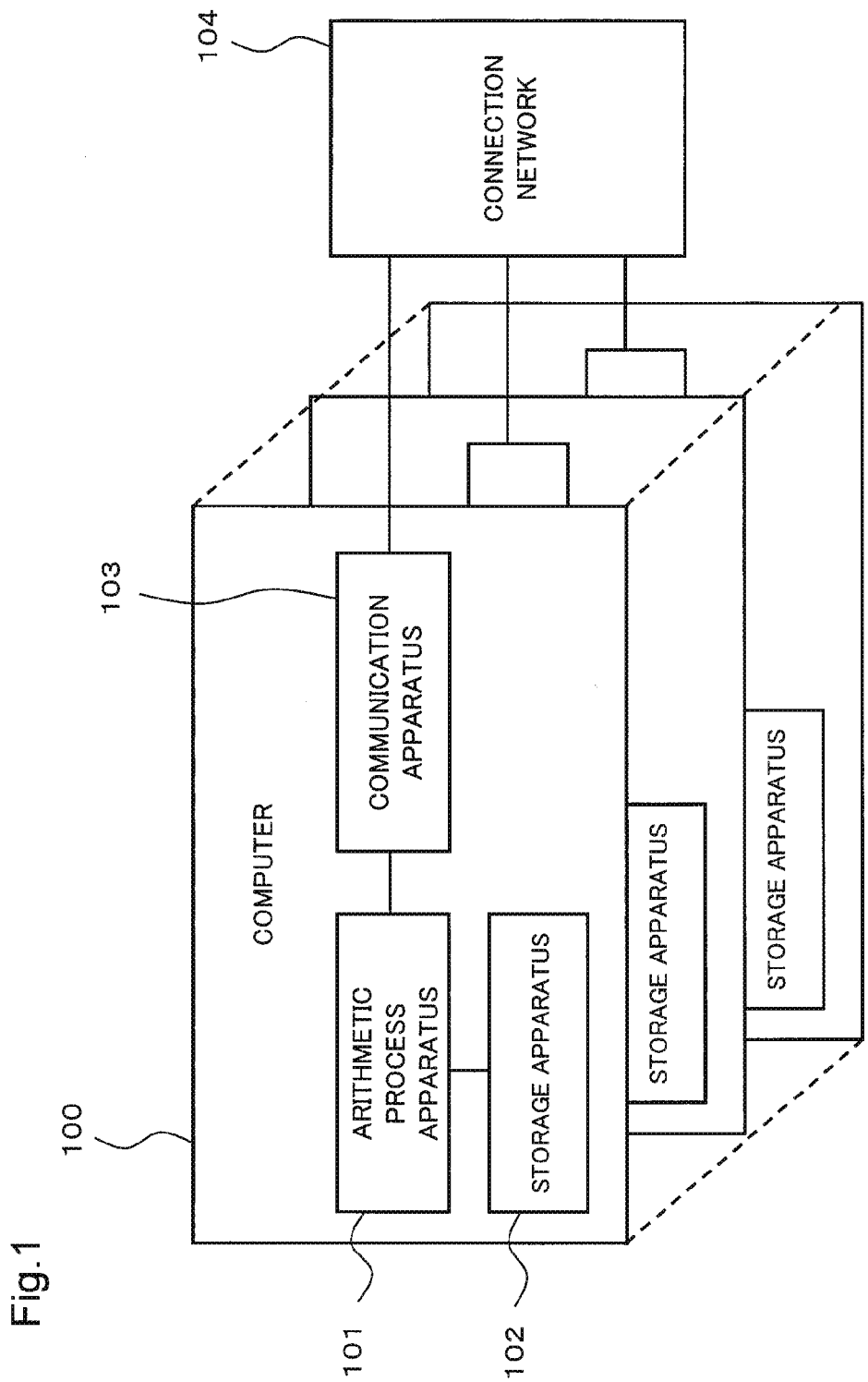
FIG. 1 is a block diagram showing a configuration of a computer system in a first exemplary embodiment of the present invention.

FIG. 1 shows a configuration of a computer system which is a target in a first exemplary embodiment. The computer system is a system including a plurality of computers 100 which are connected each other through a connection network 104. Each computer includes an arithmetic process apparatus 101, a storage apparatus 102 and a communication apparatus 103. All of the computers 100 are connected each other through the connection network 104 and can communicate each other. Structure of each arithmetic process apparatus 101, that is, architecture, process performance and the like may be identical or may be different. One or more computers 100 work as a host processor, and other computers 100 work as one or more accelerators. Number of the accelerators is not limited to one. It is not always necessary that all of the accelerators have the same architecture or the same process ability. It is assumed that there are N (N is integer not smaller than 1) kinds of architecture or N kinds of process ability.

The accelerator carries out a process according to an instruction which is received from 'host processor'. Accordingly, 'host processor' is corresponding to 'main processor' mentioned above, and 'accelerator' is corresponding to 'sub processor' mentioned above. In the first exemplary embodiment, a computer is denoted as 'host processor' or 'accelerator' which is a name expressing a role of the computer. Then, configurations of these computers will be described in the following.

A computer system including a plurality of computers which are connected each other through a bus or a network is exemplified as a specific example of the first exemplary embodiment. The bus is a general serial bus or parallel bus which is used, for example, in a personal computer or the like. The network is, for example, a wired or wireless LAN (Local Area Network). However, the computer system in the first exemplary embodiment is not limited to these examples.

Figure 2:
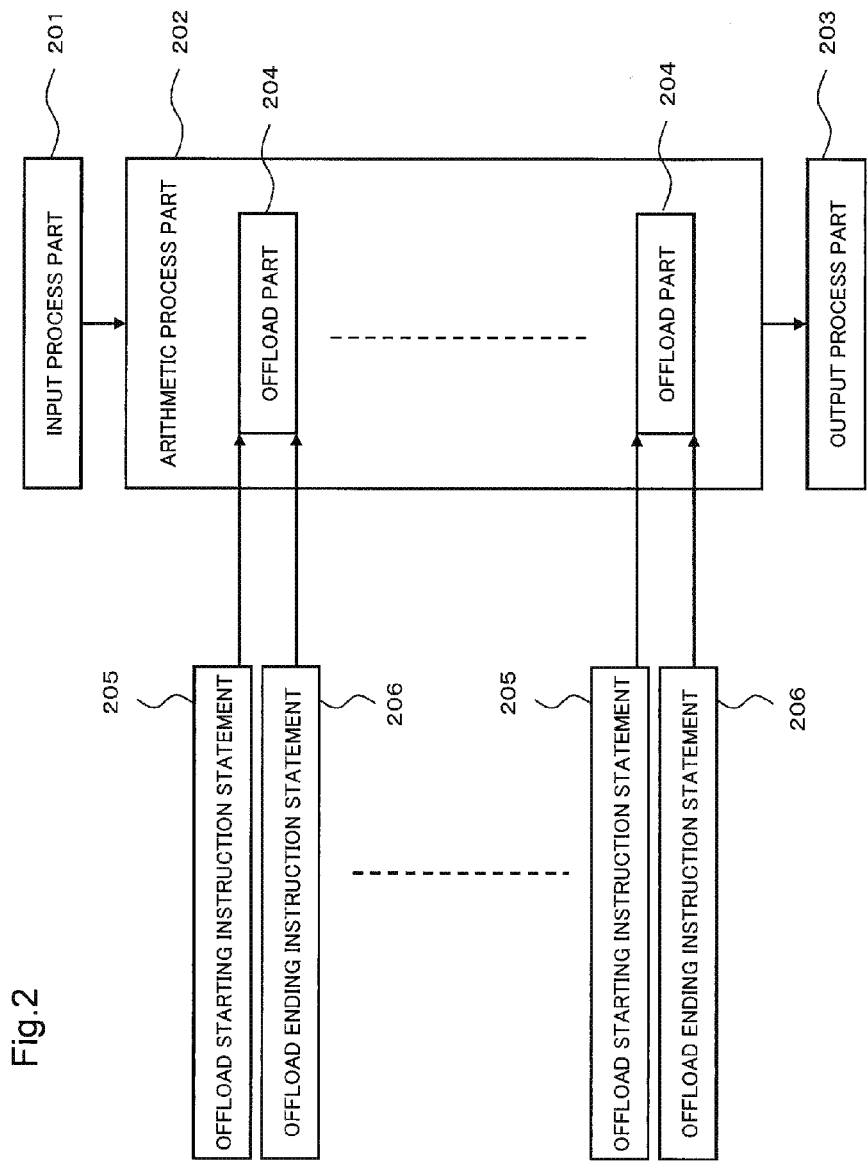
FIG. 2 shows composition of a program in the first exemplary embodiment of the present invention.

FIG. 2 shows composition of a target program which is a process target of the computer system in the first exemplary embodiment. The target program includes an input process part 201, an arithmetic process part 202 and an output process part 203.

As an example of the target program, a Web server program is exemplified. The Web server program carries out a process in response to each request which is sent by a client through a network, and returns a result of the process to the client. At this time, the Web server program uses a standard function of OS (Operating System) per the request. As a result, an execution thread or an instance is generated. A portion of the process, which is carried out by the Web server program, is designated in the Web server program so as to be executed by an accelerator which is included in the server. Here, the Web program is a mere example of the target program, and the target program is not limited to the Web server program.

The arithmetic process part 202 includes one or more offload parts 204 which are designated as a partial program executed by the accelerator. The offload part 204 has a range from an offload starting instruction statement 205 to an offload ending instruction statement 206. In the first exemplary embodiment, the target program includes the M designated offload parts (M is integer not smaller than 1).

In the first exemplary embodiment, it is assumed that, in the computer system shown in FIG. 1, there are L kinds of execution schemes (L is integer not smaller than L) in which usage of used processor resources of each processor working in the target program is different per the processor. As an example of the plural execution schemes, the following scheme is exemplified.

1) Execution Scheme to Make Only Host Processor Operate

The execution scheme is an execution scheme to make only host processor carry out all processes by neglecting offload designation.

2) Execution Scheme to Offload a Range from an Input Process to an Output Process The execution scheme is an execution scheme to make an offload target limited to a range from an input process to an output process.

3) Execution Scheme to Offload Only a Portion of the M Offload Designation Parts The execution scheme is an execution scheme to offload only a portion of the M offload designation parts, and to neglect other offload designation parts.

4) Execution Scheme to Offload any Portion of the Target Program

The execution scheme is an execution scheme to execute a converted program which is generated by predetermined conversion software so as to be able to offload any portion of the target program.

FIG. 3 shows a configuration of a program executing system in the first exemplary embodiment. The program executing system has a computer system 300 which includes a conversion apparatus 310, a host processor 320 and an accelerator 330. Each of the host processor 320 and the accelerator 330 may be a stand-alone arithmetic apparatus or may be a portion of an united computer. Moreover, it is preferable that number of the accelerators 330 is not smaller than 1, and the number has no limitation. Moreover, in the case that a plurality of the accelerators 330 exist, it is unnecessary that these accelerators 330 have the same architecture.

The conversion apparatus 310 includes specific process determining 311 and process converting unit 312.

The specific process determining unit 311 determines a part (called a specific process part) which executes a predetermined process designated in a target program 340. Here, it is assumed that each of the specific process parts is the offload target. Accordingly, M specific process parts are designated in the target program 340.

The process converting unit 312 converts the target program into a converted program 341 so as to be able to execute the M specific process parts of the target program 340 with a plurality of execution schemes. Accordingly, the converted program 341 includes an execution scheme specifying program 342 which is corresponding to each of the L kinds of execution schemes, and a process switching unit 343. The process switching unit 343 switches an execution scheme, which should be applied to the execution scheme specifying program 342, into an execution scheme which is selected one of the L kinds of execution schemes.

The host processor 320 includes execution scheme determining unit 321 and execution scheme setting unit 322.

The accelerator 330 receives an accelerator designation program 344, which is included in the execution scheme specifying program 342 and is corresponding to the execution scheme including the execution by the accelerator, from the host processor 320. Here, the accelerator 330 has no necessity to receive the execution scheme specifying program 342 corresponding to 'execution scheme to make only host processor operate' mentioned above.

(Operation of the First Exemplary Embodiment)

These units operate as described in the following.

When inputting the target program 340, the specific process determining unit 311 checks the range, in which it is possible to carry out offloading in the target program 340, by searching the range which is interposed between the specific processes in the target program 340. Then, the specific process determining unit 311 notifies the process converting unit 312 of positions of the plural specific processes in the target program 340.

When inputting the positions of the plural specific processes of which are notified by the specific process determining unit 311, the process converting unit 312 determines the range, which is interposed between the positions of the specific processes, to be a range in which it is possible to carry out offloading (offload enabling area). Then, the process converting unit 312 generates, for each offload enabling area, the execution scheme specifying program 342 of the execution scheme in the case of carrying out offloading, and the execution scheme specifying program 342 of the execution scheme in the case of not carrying out offloading. The execution scheme specifying program 342 in the case of carrying out offloading, and the execution scheme specifying program 342 in the case of not carrying out offloading are different from each other in usage of processor resource. Furthermore, the process switching unit 312 generates the converted program 341 which includes the execution scheme specifying programs 342 of both the schemes, and the process switching unit 343 to switch between the programs of both the schemes.

When inputting the converted program 341, the execution scheme determining unit 321 of the host processor selects the execution scheme of program for one input data so as to be able to use the processor resource of each processor efficiently (to use the processor resource so as to make usage of unused resource zero).

The execution scheme setting unit 322 notifies the process switching unit 343, which is included in the converted program 341, of the execution scheme, which is instructed by the execution scheme determining unit 321, through a communication unit (not shown in the figure). The communication unit is a function, which the computer system 300 has, such as OS which manages an operation of the host processor.

The target program 340 is a program including the offload part which is designated to be offloaded by the target program 340. The target program 340 is converted into the converted program 341 by the specific process determining unit 311 and the process converting unit 312.

The converted program 341 is executed with any one of the execution schemes per the input data. That is, the converted program 341 is executed after the process switching unit 343 switches the execution scheme based on the execution scheme which is designated by the execution scheme setting unit 322.

FIG. 4 is a flowchart showing an operation of a parallel process control system of the exemplary embodiment according to the present invention.

Firstly, the specific process determining unit 311 of the conversion apparatus 310 searches for a specific process in the target program 340 in order to check the offload enabling range in the target program 340. Then, the specific process determining unit 311 notifies the process converting unit 312 of positions of the plural specific processes (Step S401)

Next, the process converting unit 312 of the conversion apparatus 310 recognizes the offload enabling range from the positions of the plural specific processes of which are notified by the specific process determining unit 311. Then, the process converting unit 312 generates, for each the offload enabling range, both of the partial program in the case of carrying out offloading, and the partial program in the case of not carrying out offloading. That is, the process converting unit 312 prepares a plurality of execution scheme specifying programs which are different each other usage quantity of the processor resource. Furthermore, the process converting unit 312 generates the converted program 341 (Step S402). The converted program 341 includes the process switching unit 343 which is a program to switch between the execution scheme specifying program in the case of carrying out offloading and the execution scheme specifying program in the case of not carrying out offloading, and the above-mentioned execution scheme specifying program.

Next, the execution scheme determining unit 321 of the host processor 320 determines number of input data, which should be processed, per the execution scheme among plural of input data. Then, the execution scheme determining unit 321 selects the execution scheme of the converted program 341, which processes one input data, in order to use the processor resource of each processor (Step S403).

Finally, the execution scheme setting unit 322 of the host processor 320 notifies the process switching unit 343, which is included in the converted program 341, of the execution scheme, which is designated by the execution scheme determining unit 321, through the communication unit (Step S404).

Figure 5:
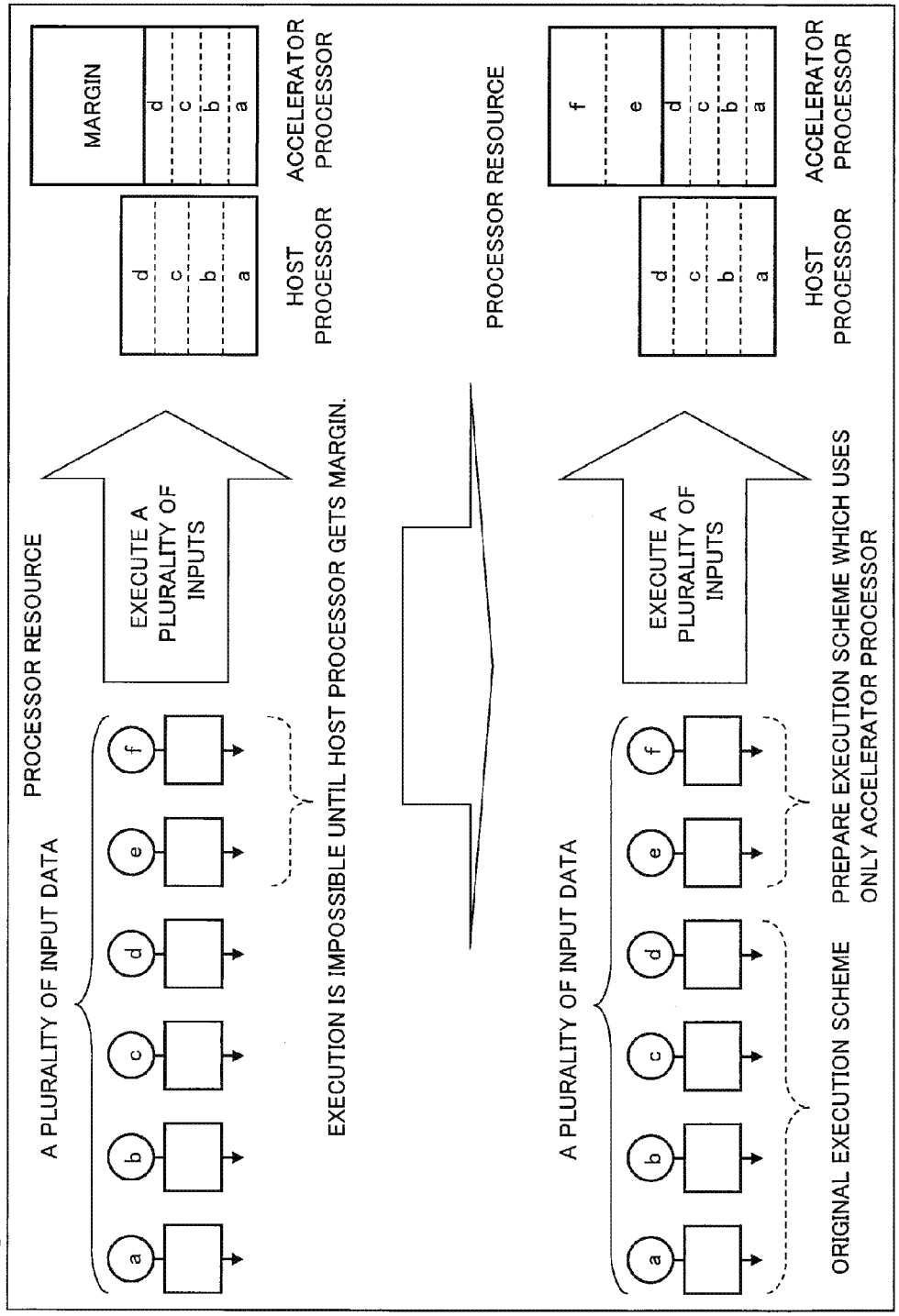
FIG. 5 is a diagram exemplifying a case that a processor resource, which has not been used, is used in the first exemplary embodiment of the present invention.

As mentioned above, by the flow in the first exemplary embodiment, it is possible to generate the converted program 341 including the plural execution schemes which are different in the usage quantity of the processor resource of each processor. Furthermore, it is possible to realize the program executing unit which switches the execution scheme per the input data. Therefore, by selecting the execution scheme using the processor resource which has not been used, it is possible to reduce the unused quantity of the resources to the utmost. FIG. 5 exemplifies a case that, by virtue of the first exemplary embodiment, more input data can be processed by using the unused processor resource.

As mentioned above, the computer system in the first exemplary embodiment can enhance throughput of the system by using the processor resource effectively.

In the first exemplary embodiment, it is possible to set variously the range of the specific area in which it is possible to offload the target program. Examples of setting the offload enabling area will be exemplified in a second exemplary embodiment and a third exemplary embodiment which will be described later. Specifically, 2) 'Execution scheme to offload a range from an input process to an output process' among the execution schemes mentioned above will be described as the second exemplary embodiment, and 3) 'Execution scheme to offload only a portion of offload designation parts' among the execution schemes mentioned above will be described as the third exemplary embodiment.

<Second Exemplary Embodiment>

According to the second exemplary embodiment, the specific process determining unit 311 determines 'range from an input process to an output process' of the target program 340 to be the specific process, and determines the range to be the offload enabling range.

Figure 6:
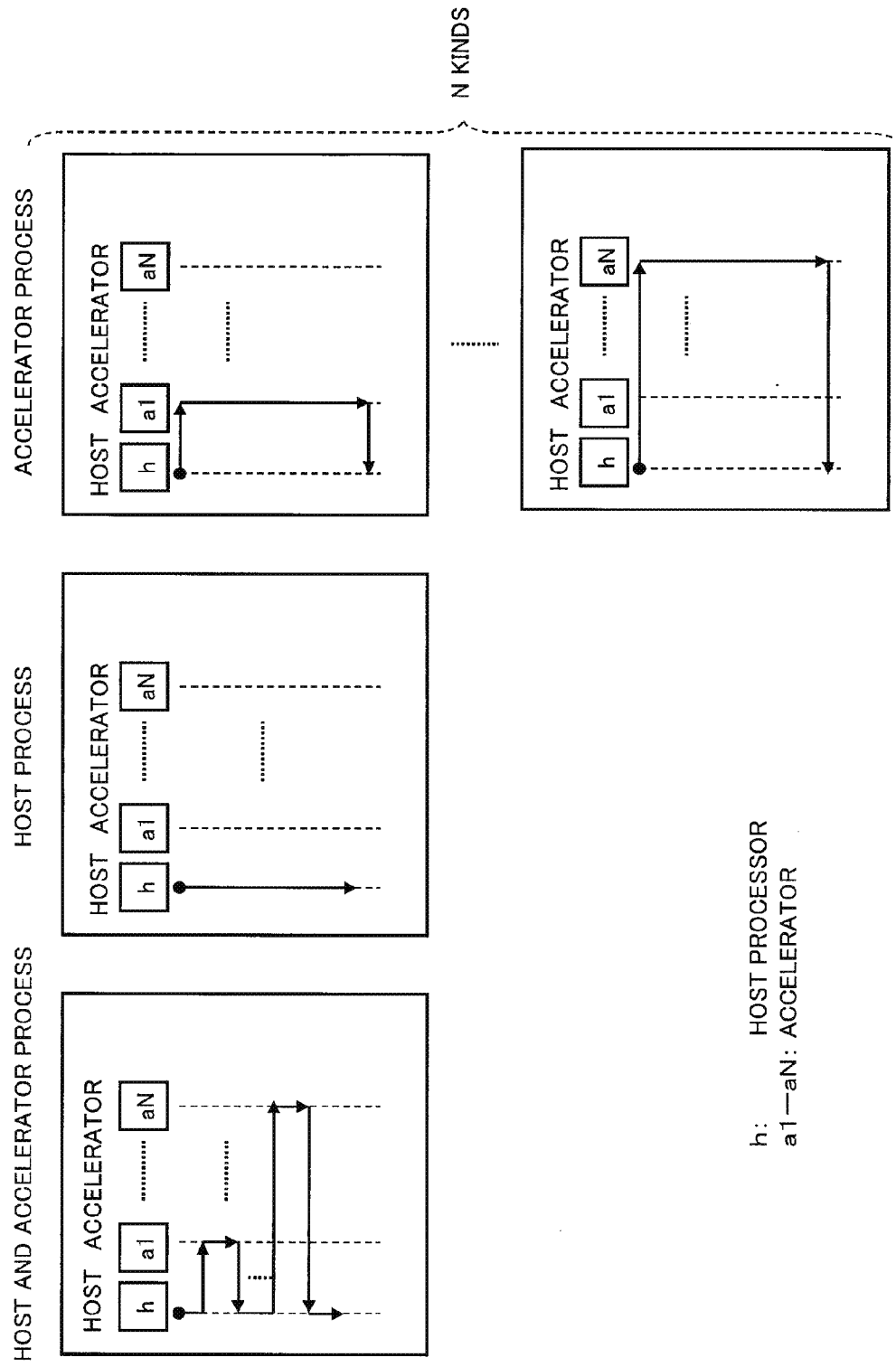
FIG. 6 is a diagram showing an execution scheme which is set in a second exemplary embodiment of the present invention.

In the case that the range from the input process to the output process is the offload enabling range, there are (N+2) kinds of execution schemes, which are different in the used quantity of the processor resource of each processor in the converted program in a first parallel process control system. As a breakdown of the kinds, there are one kind of the original execution scheme of the target program 340 which operates the host processor 320 and the N accelerators 330 in parallel according to a predetermine procedure, one kind of the execution scheme in which the host processor 320 executes the range from the input process to the output process, and N kinds of the execution scheme which N kinds of accelerators execute. FIG. 6 shows an example of plural execution schemes which are set in the second exemplary embodiment.

In order to set the specific process as mentioned above, in Step S401 described in the first exemplary embodiment, the following is processed in the second exemplary embodiment. That is, in order to check the offload enabling range in the target program 340, the specific process determining unit 311 searches for the range which is interposed between the input process and the output process in the target program 340, and notifies the process converting unit 312 of the range.

In the second exemplary embodiment, it is possible to use the execution scheme in which each of N accelerators processes only one offload part. That is, each accelerator has the execution scheme which can operate independently. Accordingly, even if only processor resource of one accelerator cannot be used efficiently, it is possible to use the processor resource efficiently by carrying out offloading to the accelerator.

<Third Exemplary Embodiment>

According to the third exemplary embodiment, the specific process determining unit 311 determines 'range to which offloading is designated' in the target program 340 to be the specific process part, and determines the range to be the offload enabling range. That is, the range to which offloading has been designated already is the offloading enabling area.

Figure 7:
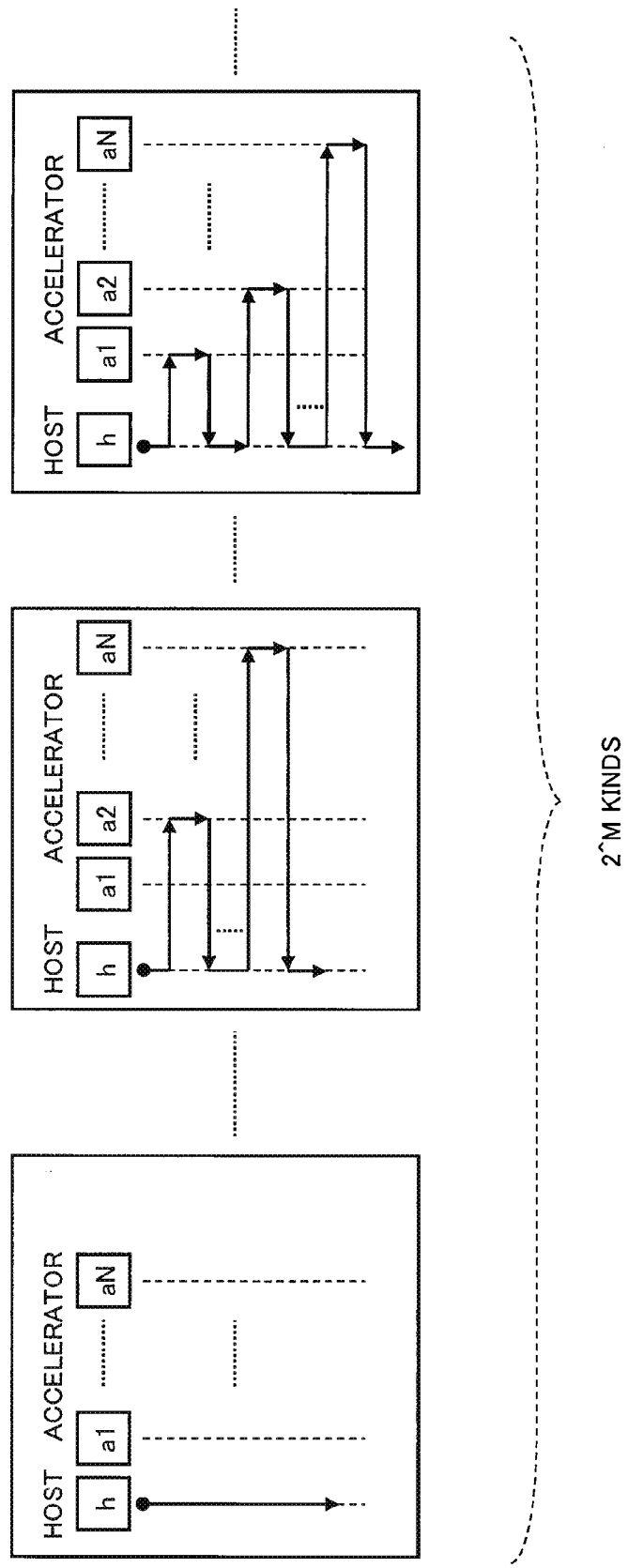
FIG. 7 is a diagram showing an execution scheme which is set in a third exemplary embodiment of the present invention.

In this case, if the target program includes the M offload designation parts, there are (2^M) kinds of the execution schemes of the program which are different in usage quantity of the processor resource of each processor. The reason is that a combination of the execution schemes includes a case of offloading all of the M offload designation parts up to a case of not offloading any parts. FIG. 7 exemplifies a plurality of execution schemes which are set in the third exemplary embodiment.

In the third exemplary embodiment, in order to set the specific process as mentioned above, in Step S401 described in the first exemplary embodiment, the following is processed. That is, in order to check the range, to which offloading is designated, in the target program 340, the specific process determining unit 311 searches for a set of a position at which offloading is started, and a position at which offloading is ended, and notifies the process converting unit 312 of these positions.

According to the third exemplary embodiment, it is possible to neglect a portion of the M offload designation parts in the target program 340 to avoid offloading the portion. The usage quantity of the processor resource, which is used in the case of offloading the offload designation part actually, is different from the usage quantity of the processor resource which is used in the case of not offloading the offload designation part. Accordingly, by adjusting number of parts, which are offloaded actually, among the M offload designation parts, it is possible to prepare plural kinds of execution schemes which are different in usage quantity of the processor resources. Therefore, the computer system in the third exemplary embodiment can enhance throughput of the system by selecting the execution scheme, which uses the adequate usage quantity of the resource, and can reduce the unused resource to the utmost.

Here, it is possible to combine the second exemplary embodiment and the third exemplary embodiment. That is, it is possible to combine the original offload execution scheme for the target program 340 with the execution scheme of processing the offload part by one of the host processor and the N accelerators, and the execution scheme of offloading only a portion of the M offload designation parts.

The combination increases the kinds of execution scheme. As a result, the computer system can use the processor resource, which have not been used, more flexibly and efficiently, and can make throughput enhanced furthermore.

Meanwhile, in order to enhance throughput, it is also possible to change number of input data (hereinafter, called 'allotment number'), which is processed for each execution scheme, in the first exemplary embodiment to the third exemplary embodiment. Examples of a method of determining the allotment number will be exemplified in a fourth exemplary embodiment to a sixth exemplary embodiment which will be described later.

<Fourth Exemplary Embodiment>

According to a fourth exemplary embodiment, allotment number of the input data which are processed simultaneously for each execution scheme is determined so as to use the processor resource of each processor efficiently. Then, based on the allotment number, the execution scheme for each input data is determined.

As an example of the method of determining the allotment number, designation by an user, calculation by using a predetermined algorithm based on a specification of the system and a profile result of a program, or the like are exemplified. 'Profile' mentioned above, which is called 'profile at a time of execution', is various information on execution of a program. This information includes a required execution time, the usage quantity of processor resource or the like which are necessary information to process a partial process of a program. Here, in the present invention, the method of determining the allot number has no limitation especially.

In order to determine the allotment number, in Step S403 described in the first exemplary embodiment, specifically the following process is carried out in the fourth exemplary embodiment. That is, the execution scheme determining unit 321 determines the allotment number of each execution scheme in an order of highness of priority so as to use the processor resource of each processor efficiently with high throughput. Then, the execution scheme determining unit 321 determines the execution scheme of the program for one input data (Step S403).

Figure 8:
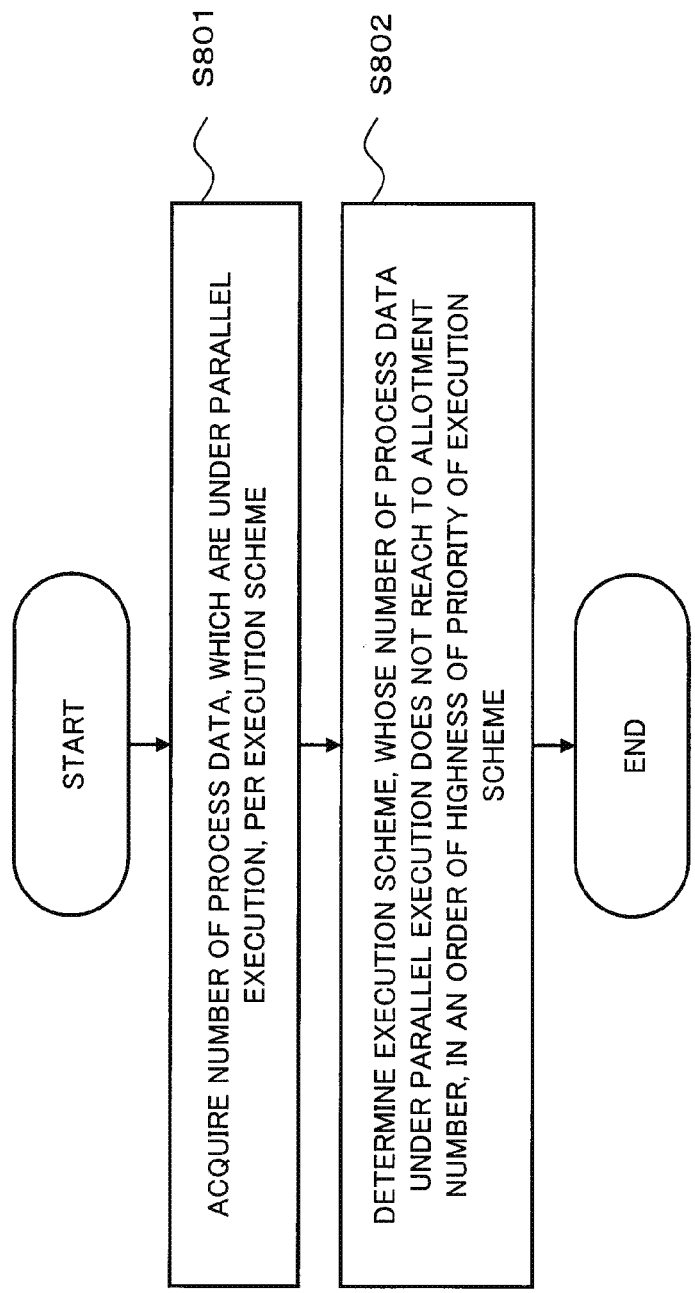
FIG. 8 is a flowchart showing an operation to determine an execution scheme in a fourth exemplary embodiment of the present invention.

FIG. 8 is a flowchart showing an operation which the execution scheme determining unit 321 determines the allotment number of the execution scheme and afterward determines the execution scheme for one input data.

Firstly, the execution scheme determining unit 321 acquires number of process data (hereinafter, called number of simultaneous process data) which are processed simultaneously per the execution scheme (Step S801).

Next, the execution scheme determining unit 321 determines the execution scheme, whose number of simultaneous process data does not reach the allotment number, in the order of highness of priority of the execution scheme (Step S802).

Finally, in order to realize high throughput, the execution scheme determining unit 321 determines the allotment number of each execution scheme, and determines the execution scheme based on the determined allotment number and the number of simultaneous process data of each execution scheme during processing, and notifies the execution scheme setting unit 322 of the determined execution scheme.

According to the fourth exemplary embodiment, the execution scheme determining unit 321 determines the allotment number before executing the program. Therefore, it is unnecessary to determine the allotment number by using the processor resource during executing the program. The process for determining the allotment number is not included in the target program, and causes influence on throughput relating in an actual operation. That is, the process for determining the allotment causes overhead. Then, by determining the allotment number before executing the program, it is possible to avoid a status that number of data which the execution scheme with high priority processes is smaller than ideal number, and a status that number of data which the execution scheme with low priority processes is larger than ideal number, and consequently it is possible to execute the program in an ideal status. Accordingly, the computer system in the fourth exemplary embodiment can acquire optimum throughput by executing the program using the combination of plural execution schemes.

Here, an user may designate the allotment number in the converted program so that throughput may become highest.

<Fifth Exemplary Embodiment>

Figure 9:
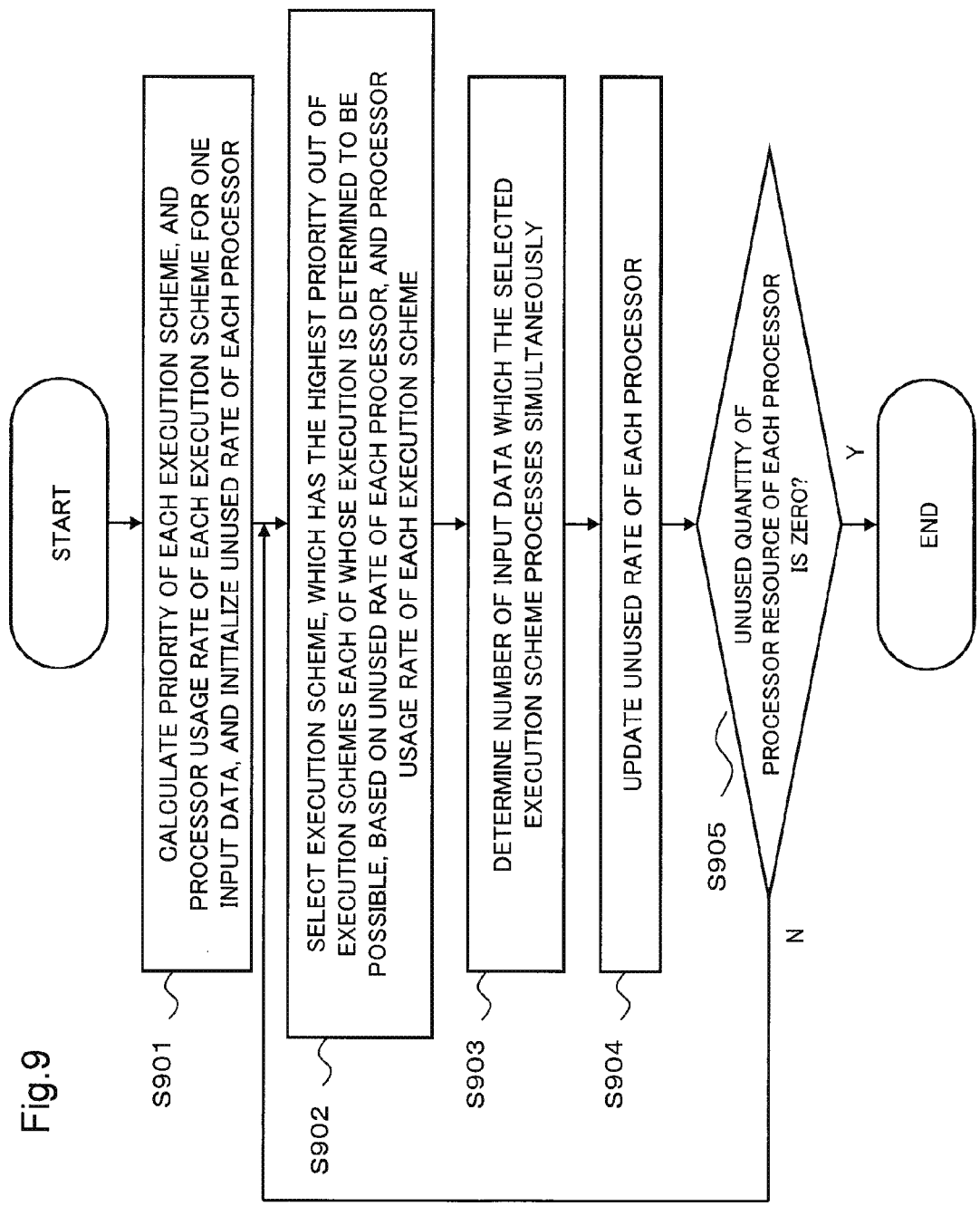
FIG. 9 is a flowchart showing an operation to determine an execution scheme in a fifth exemplary embodiment of the present invention.

According to a fifth exemplary embodiment, the allotment number of each execution scheme is determined based on parameters of the program and the processor. FIG. 9 is a flowchart showing an operation in which the execution scheme determining unit 321 determines the allotment number.

Firstly, the execution scheme determining unit 321 calculates priority of each execution scheme, and a processor usage rate of each execution scheme for one input data, and initializes an unused rate of each processor (Step S901)

As an example of a way for calculating the priority of each execution scheme, it is exemplified that high priority is allotted in an order of lowness of latency of each execution scheme, that is, in an order of shortness of an execution time of the program processing one input data. As an example of the processor usage rate of each execution scheme for one input data, a ratio of the execution time of each processor per unit time is exemplified. A method to set unused rate of each processor to be 100% as an initial value is exemplified.

Next, based on the unused rate of each processor, and the processor usage rate of each execution scheme for one input data, the execution scheme determining unit 321 selects an execution scheme, which has the highest priority, among the execution schemes each of which is determined that execution is possible since the used processor has a margin (Step S902).

Next, the execution scheme determining unit 321 determines number of input data which the selected execution scheme processes simultaneously (Step S903).

As an example of a way for determining the number of input data, it is exemplified that, for each processor, the unused rate is divided by the processor usage rate of the execution scheme for one of input data, and the minimum division result is defined as the number of input data which the selected execution scheme processes simultaneously. Here, the way for determining the number of input data has no limitation especially.

Next, the execution scheme determining unit 321 updates the unused rate of each processor (Step S904). That is, the execution scheme determining unit 321 calculates the processor usage rate in the case that number of the input data, which is determined in Step S903, are processed with the selected execution scheme. The execution scheme determining unit 321 subtracts the calculated processor usage rate from the unused rate of the processor, and defines the subtraction result as an updated unused rate of the processor.

Finally, the execution scheme determining unit 321 determines whether all of the unused quantity of each processor are zero (Step S905). In the case that all of the unused rate of each processor is zero, execution of the allotment number determining algorithm is ended. On the other hand, in the case of not zero, the procedure transits to Step S902.

According to the fifth exemplary embodiment, the allotment number is calculated automatically based on the parameter of the processor and the parameter of the target program. It is possible to execute the process for calculating the allotment number before executing the program. Therefore, a process to determine the allot number by using the processor resource during executing the program is unnecessary. Accordingly, the computer system has the same effect as that in the fourth exemplary embodiment, that is, it is possible to acquire optimum throughput by executing the program using the combination of plural execution schemes <Sixth Exemplary Embodiment>

According to a sixth exemplary embodiment, a temporary allotment number is determined and an execution scheme is selected based on the temporary allotment number.

Figure 10:
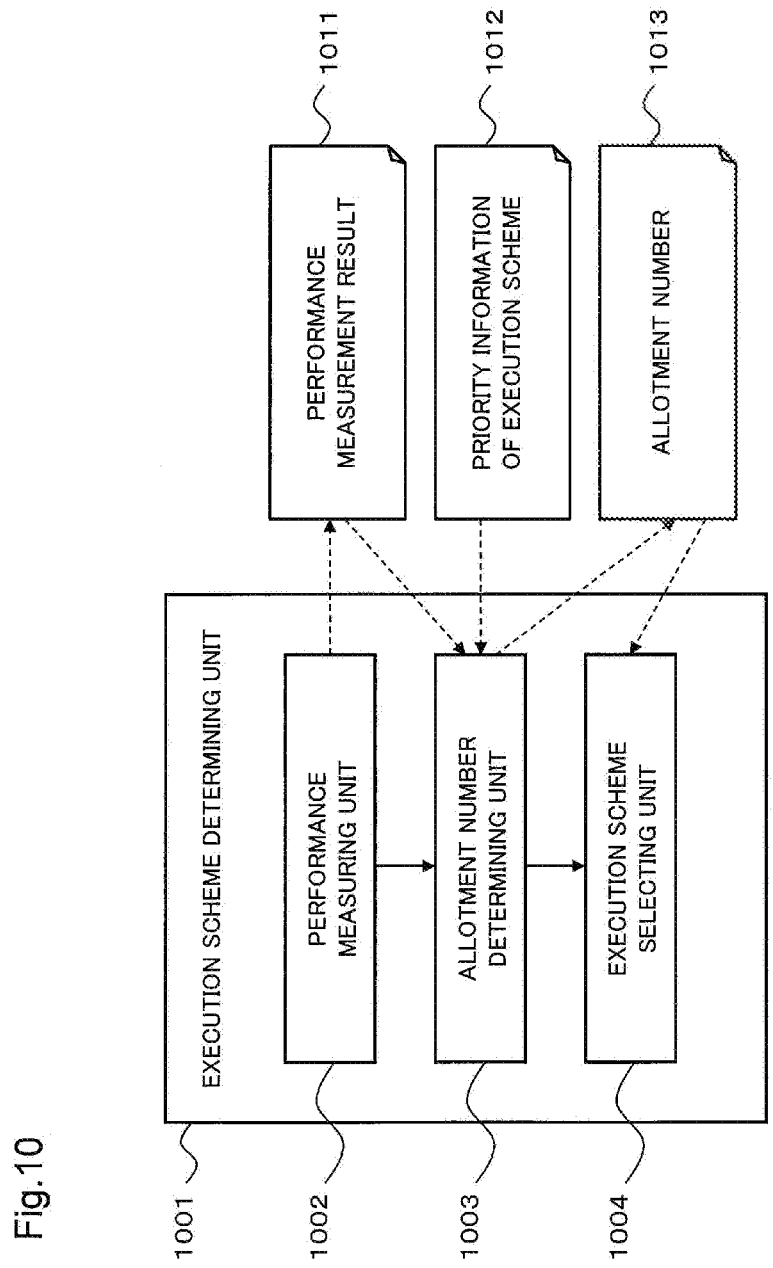
FIG. 10 is a block diagram showing a configuration of an execution scheme determining unit in a sixth exemplary embodiment of the present invention.

FIG. 10 is a block diagram showing a configuration of an execution scheme determining unit 1001 in the sixth exemplary embodiment.

The execution scheme determining unit 1001 includes performance measuring unit 1002, allotment number determining unit 1003 and execution scheme selecting unit 1004. Moreover, as information exchanged among these unit, there are a performance measurement result 1011, an execution scheme's priority information 1012 and allotment number 1013 which is corresponding to the number of input data which are processed with each execution scheme.

Figure 11:
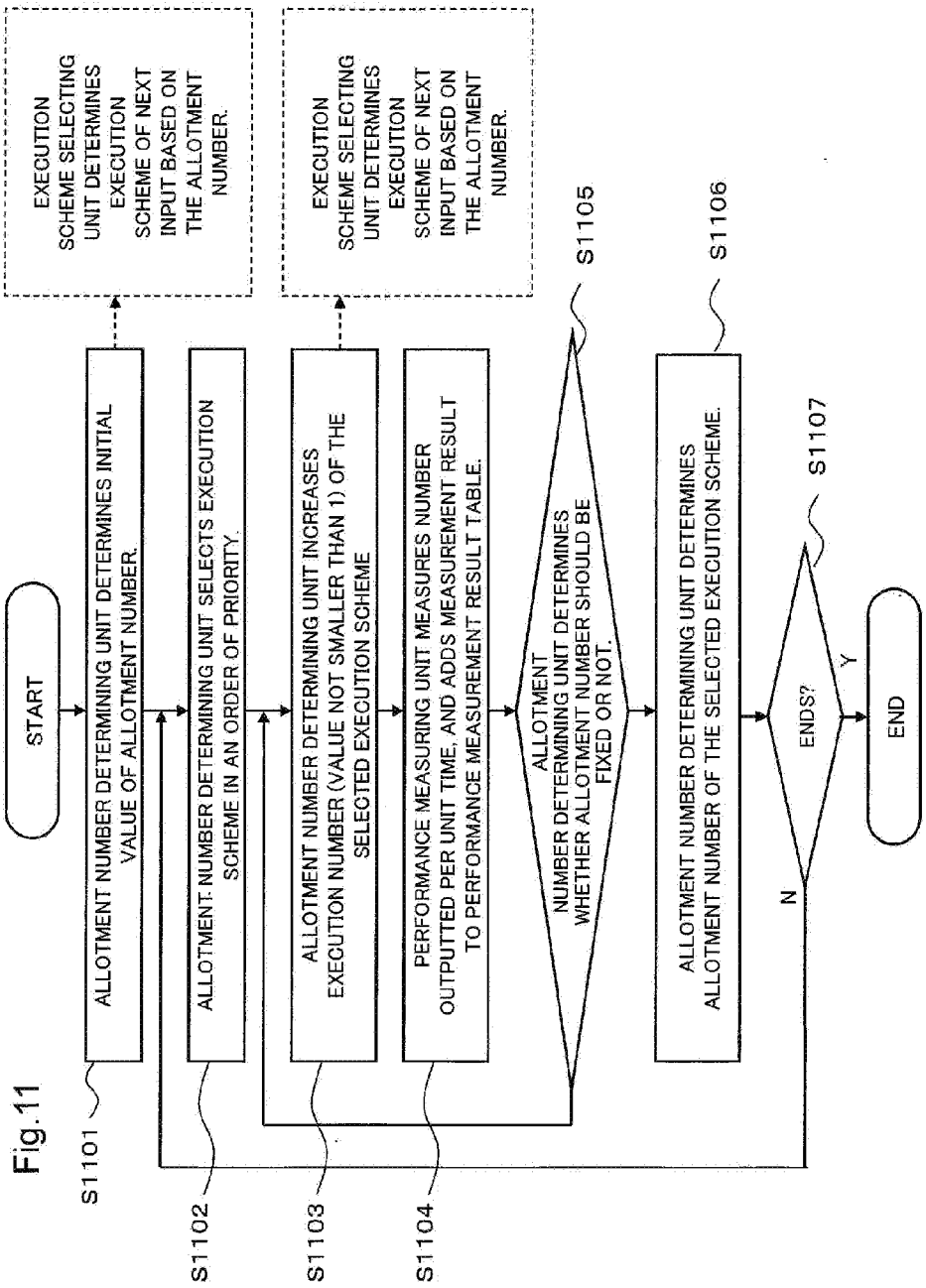
FIG. 11 is a flowchart showing an operation of the execution scheme determining unit in the sixth exemplary embodiment of the present invention.

FIG. 11 is a flowchart showing an operation of the execution scheme determining unit 1001 in the sixth exemplary embodiment. FIG. 12 is an example of the management table of the performance measurement result used in an operation which is carried out in the case of preparing three kinds of execution scheme.

Firstly, the allotment number determining unit 1003 determines an initial value of the allotment number (Step S1101). The execution scheme selecting unit 1004 selects the execution scheme for an input based on the determined allotment number. Then, execution of the converted program 341 is started.

Next, the allotment number determining unit 1003 selects the execution scheme, whose allotment number has not been fixed, based on the priority information of the execution scheme (Step S1102).

The allotment number determining unit 1003 increases the allotment number of the selected execution scheme (Step S1103). The execution scheme selecting unit 1004 selects the execution scheme for an input based on the current allotment number which has been increased. Then, any one of three kinds of the execution scheme specifying program 342, which are included in the converted program 341, is executed.

Performance measuring unit 2301 measures throughput performance per unit time, and adds the measurement result to the management table which includes a set of the allotment number of each execution scheme and the throughput performance (Step S1104).

The allotment number determining unit 1003 determines whether the allotment number should be fixed (Step S1105). In the sixth exemplary embodiment, it is assumed that a condition (hereinafter, called allotment number fixation condition) of fixing the allotment number is that 'performance measurement result, which is acquired when the target execution scheme is increased, is degraded in comparison with the performance measurement result acquired before the increase'. However, the allotment number fixation condition may be to fix the allotment number when addition or deletion of the performance measurement result is generated. Accordingly, the allotment number fixation condition is not limited to the above-mentioned condition.

Then, in the case that the performance measurement result satisfies the allotment number fixation condition, and consequently the allotment number is fixed, the procedure transits to Step S1106, and in the case that to fix the allotment number is not determined, the procedure transits to Step S1103.

Next, the allotment number determining unit 1003 fixes the allotment number of the selected execution scheme (Step S1106). In the sixth exemplary embodiment, when the performance measurement result is the same as performance measurement result which is acquired before the allotment number is increased, the increased allotment number is fixed as the allotment number of the selected execution scheme.

Finally, the allotment number determining unit 1003 determines whether the flow to determine the allotment number dynamically is ended (Step S1107). In the sixth exemplary embodiment, in the case that a condition that all of the allotment number of each execution scheme are fixed is satisfied, the flow is ended, and in the case that the condition is not satisfied, the procedure transits to Step S1102.

By the above-mentioned operation of the allotment number determining unit 1003, the allotment number of each execution scheme is determined and it is possible to execute the program based on the allotment number.

In order to understand the operation of the execution scheme determining unit 1001 in the sixth exemplary embodiment, a process flow shown in FIG. 11 will be described in the following with indicating a specific value.

Firstly, the allotment number determining unit 1003 determines an initial value of the allotment number (Step S1101). In the sixth exemplary embodiment, as the initial value of the allotment number, the allotment number determining unit 1003 sets '15', '0' and '0' to an execution scheme 1, an execution scheme 2 and an execution scheme 3 respectively. The execution scheme selecting unit 1004 selects the execution scheme for an input based on the set allotment number. Then, execution of an application is started.

Next, the allotment number determining unit 1003 selects the execution scheme, whose allotment number has not been fixed, based on the priority information of execution scheme (Step S1102). In the sixth exemplary embodiment, the execution scheme 1 is selected in order to fix the allotment number of the execution scheme 1 which has the highest priority.

The allotment number determining unit 1003 increases the allot number of the selected execution scheme (Step S1103). In the sixth exemplary embodiment, the allotment number is increased by 1. The execution scheme selecting unit 1004 selects the execution scheme for an input based on the current allotment number which is increased. Then, an application is executed.

The performance measuring unit 1001 measures throughput performance per unit time, and adds the measurement result to the management table (Step S1104). In the sixth exemplary embodiment, the throughput performance to be measured is defined as number of data which are outputted per one second. However, the performance to be measured is not limited to the throughput. As the performance value acquired when carrying out a process in an initial state in which the allotment number of each the execution scheme 1, 2 and 3 is '15', '0' and '0' respectively, '150' is written in the management table in the sixth exemplary embodiment.

The allotment number determining unit 1003 determines whether the allotment number should be fixed (Step S1105). In the sixth exemplary embodiment, the allotment number fixation condition is that the performance measurement result, which is acquired when the target execution scheme is increased, is degraded in comparison with the performance measurement result acquired before the increase.

In the case that fixation of the allotment number is determined, the procedure transits to Step S1106, and in the case that fixation of the allotment number is not determined, the procedure transits to Step S1103. In the sixth exemplary embodiment, as shown in the management table of FIG. 12, the performance result is degraded from '200' to '190' between result number 5 and result number 6. Accordingly, when a process corresponding to the result number 6 is carried out, the procedure transits to Step S1106.

In Step S1106, the allotment number determining unit 1003 fixes the allotment number of the selected execution scheme. In the sixth exemplary embodiment, when the performance measurement result is the same as performance measurement result which is acquired before the allotment number is increased, the increased allotment number is fixed as the allotment number of the selected execution scheme. In the sixth exemplary embodiment, the allotment number determining unit 1003 fixes in '20' as the allotment number of the execution scheme 1 based on the management table shown in FIG. 12.

Finally, the allotment number determining unit 1003 determines whether the flow to determine the allotment number dynamically is ended (Step S1107). In the exemplary embodiment, in the case that the condition that all of the allotment number of each execution scheme are fixed is satisfied, the flow is ended, and in the case that the condition is not satisfied, the procedure transits to Step S1102.

In the sixth exemplary embodiment, the allotment number which can produce high throughput during executing is searched for. Accordingly, the computer system in the sixth exemplary embodiment can determine the allotment number without parameters of the processor and the target program.

<Seventh Exemplary Embodiment>

A specific computer system is exemplified as a seventh exemplary embodiment.

Figure 13:
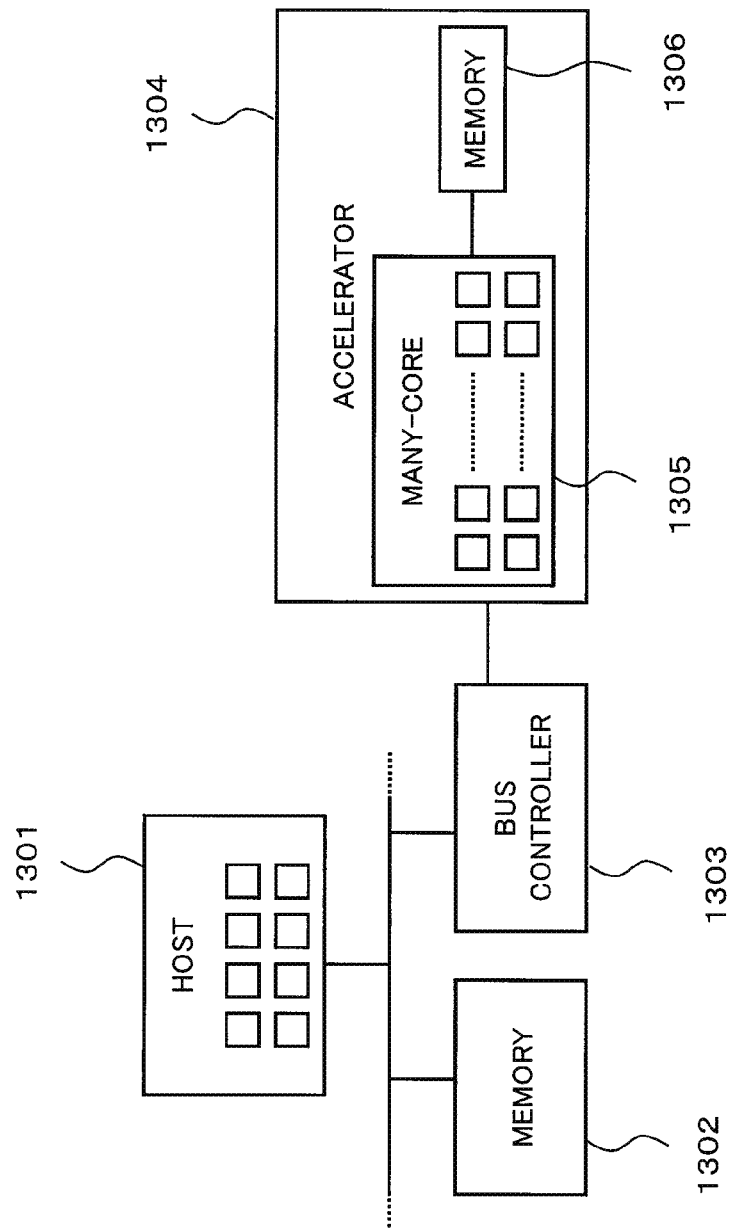
FIG. 13 is a block diagram exemplifying a configuration of a computer system in a seventh exemplary embodiment of the present invention.

FIG. 13 shows a configuration of a computer system including a multi-core which is corresponding to the host processor, and a many-core which is corresponding to the accelerator.

The computer system of the seventh exemplary embodiment includes a host processor 1301, a host memory 1302, a bus controller 1303 and an accelerator 1304. The accelerator 1304 includes a many-core 1305 and a memory 1306 internally.

The host processor 1301 and the many-core 1305 are different each other in architecture and number of built-in CPUs (Central Processing Unit). Since the host processor 1301 and the many-core 1305 are different each other in structure and number of arithmetic units, the host computer 1301 and the many-core 1305 have a relatively favorite process and an relatively un-favorite process.

In the seventh exemplary embodiment, the host processor 1301 includes 8 CPUs and the many-core 1305 includes 40 CPUs. Moreover, CPU of the host processor 1301 and CPU of the many-core 1305 are different each other in performance which is acquired when executing a vector operation and a scalar operation. For example, when assuming that performance of one CPU in the host processor 1301 for a scalar operation is 1, the performance of one CPU in the many-core 1305 for the scalar operation is 0.25. Accordingly, CPU of the host processor 1301 has higher performance than CPU of the many-core 1305 has. Moreover, when assuming that performance of one CPU in the host processor 1301 for a vector operation is 1, performance of one CPU in the many-core 1305 for the vector operation is 2. Accordingly, CPU of the many-core 1305 has higher performance than CPU of the host processor 1301 has.

The host processor 1301 and the accelerator 1304 are connected each other via the bus controller 1303.

With respect to software, OS used for the host processor and OS used for the accelerator operate independently. Communication between the host processor 1301 and the accelerator 1304 is realized by a general art such as a socket or the like.

There is a function that the host processor 1301 instructs the accelerator 1304 to start carrying out a process in order to realize execution of offload. Moreover, each of the host processor 1301 and the accelerator 1304 has a specific IP (Internet Protocol) address.

Figure 14:
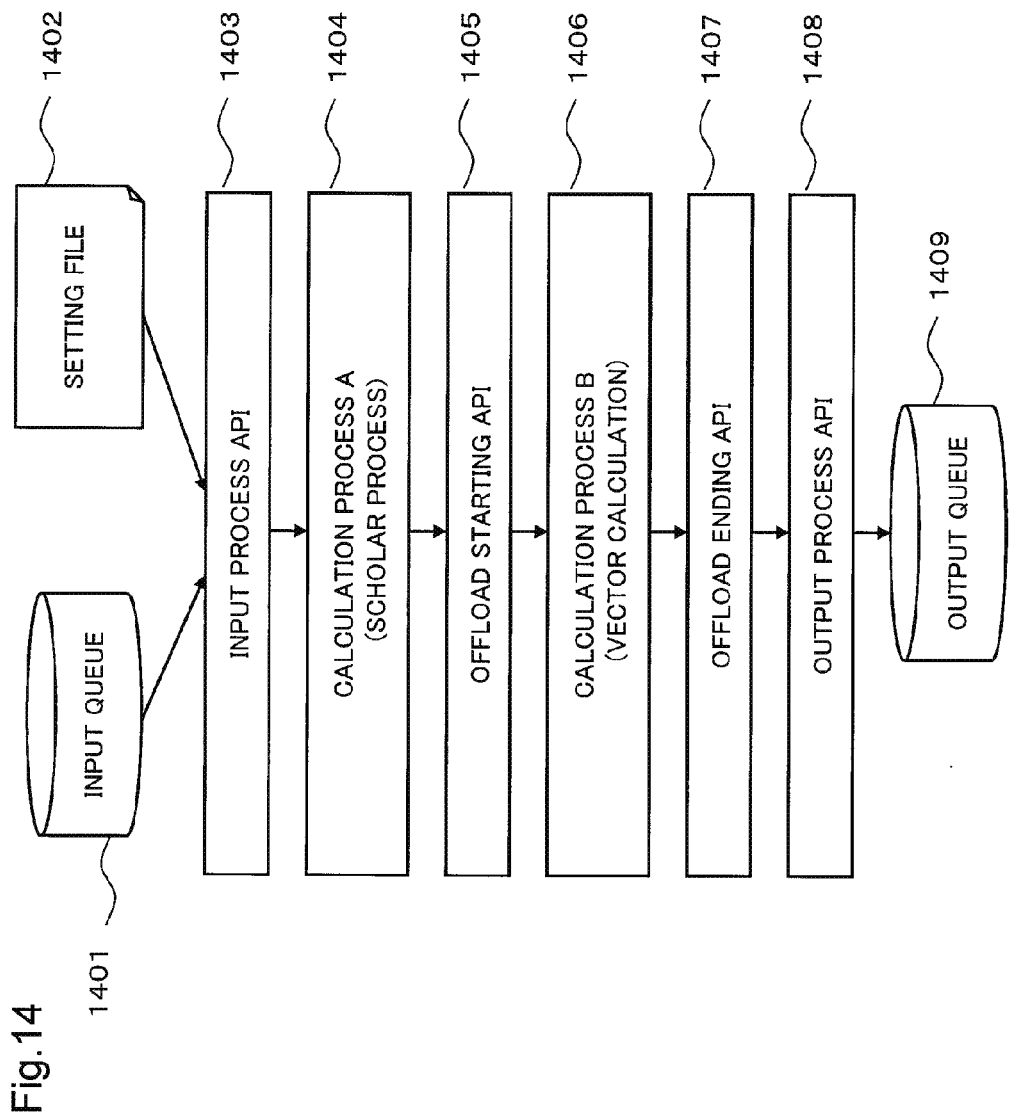
FIG. 14 is a diagram showing composition of an image processing program, which includes offload designation, in the seventh exemplary embodiment of the present invention.

FIG. 14 is a composition diagram showing an image processing program, which includes offload designation, for one input in the seventh exemplary embodiment.

The target program 340 includes an input process API (Application Program Interface) 1403, a calculation process A 1404, an offload starting API 1405, a calculation process B 1406, an offload ending API 1407 and an output process API 1408.

An input queue 1401 includes image data at the time the target program 340 is started to execute. An execution parameter of the program such as a command line argument or the like is provided in a setting file 1402. By the target program 340, necessary information is read out from the input queue and the setting file 1402, and a process result is output to an output queue 1409. An operation according to each component included in the target program 340 will be described in the following.

In the input process API 1403, information which is required for executing the program is set by acquiring the execution parameter from the setting file 1402 and acquiring the image data from the input queue 1401.

A mechanism which acquires data from the input queue by the input process API 1403 will be described in the following. That is, a management thread of the input queue 1401 in the host processor 320 sends the data of the input queue 1401 to program with the socket. Then, the input process API 1403, which is executed by a program thread, receives the data with the socket.

The input process API 1403 receives the command line argument and sets data which is required for executing the program. Therefore, the data which is required for executing the program is only the command line argument.

The calculation process A 1404 executes a process, which uses the information set by the input process API 1403 as input, with a scalar operation process which is included in the target program 340.

The offload starting API 1405 designates a starting point of offloading from the host processor 320 to the accelerator 330, and data which is transferred from the host processor 320 to the accelerator 330.

The calculation process B 1406 executes a process, which uses an intermediate result acquired from the calculation process A 1404, with a vector operation process which is included in the target program 340.

The offload ending API 1407 designates an ending point of offloading from the host processor 320 to the accelerator 330, and data which is transferred from the host processor 320 to the accelerator 330.

The output process API 1408 adds a result of the calculation process B to the output queue 1409.

A mechanism by which the output process API 1408 adds data to the output queue 1409 will be described in the following. That is, the output process API 1408, which is a program thread, sends data with the socket. Then, a thread which is executed by the host processor receives data with a socket, and adds the data to the output queue 1409.

The output process API 1408 receives only result data as an argument, and writes the result data in the output queue. Therefore, there is no data which the output process API 1408 generates.

A ratio of an execution time of each of the input process API and the output process API to an execution time of the whole program is negligibly small. Moreover, a ratio of an execution time of the calculation process A 1404 is 40%, and a ratio of an execution time of the calculation process B 1406 is 60%.

Both of the calculation process A and the calculation process B can be executed by either the host processor 320 or the accelerator 330. In the seventh exemplary embodiment, both of a compiler used for the host processor 320 and a compiler used for the accelerator 330 are prepared. Therefore, in the computer system in the seventh exemplary embodiment, it is possible that a processor which executes one program generates two kinds of execution file different each other based on that program.

The input process API 1403 realizes to acquire data from the input queue 1401 by using the socket. Therefore, either the host processor 320 or the accelerator 330 can execute the calculation process.

The output process API 1408 realizes to output data into the output queue 1409 with the socket. Therefore, either the host processor 320 or the accelerator 330 can execute the process.

In the seventh exemplary embodiment, the execution scheme 2 is prepared as the execution scheme to allot the processors for executing the program. This execution scheme 2 is different from the execution scheme 1 which is an original execution scheme. In the case that the execution scheme is different, the usage quantity of the resource of each processor is different. Therefore, by executing in parallel for a plurality of input data with a plurality of the execution schemes, it is possible to reduce excessive resources to the utmost. Accordingly, the computer system can enhance throughput of the whole system. Hereinafter, the system which executes in parallel the execution schemes different each other is called 'execution scheme parallel system'. Moreover, the host processor 320 and accelerator 330 are called merely 'host' and 'accelerator' respectively.

Figure 15:
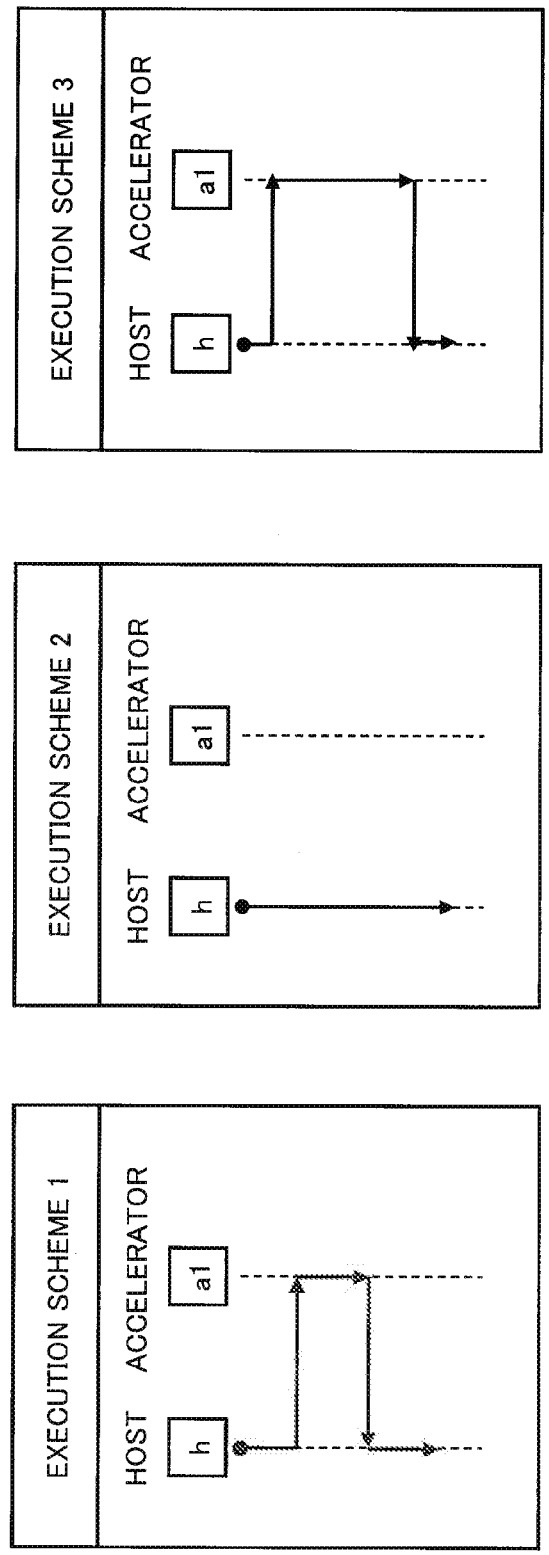
FIG. 15 is a diagram exemplifying an execution scheme which can be realized by an execution scheme parallel system in the seventh exemplary embodiment of the present invention.

FIG. 15 shows an example of plural execution schemes of the program which can be realized in the execution scheme parallel system.

'Execution scheme 1' is the execution scheme of an original program which includes offload designation, and a portion of the program is offloaded from the host to the accelerator. In the execution scheme 1, a process is carried out according to the following flow.

Firstly, on the host side, the input API and the calculation process A are executed. Then, the host executes the offload starting API, and the host transfers data to the accelerator.

Next, on the accelerator side, the calculation process B is executed. Then, the accelerator executes the offload ending API, and the accelerator transfers data to the host.

Finally, on the host side, the output API is executed.

In the execution scheme 1, both of the processor resources of the host and the accelerator are used for one input. Here, in the seventh exemplary embodiment, 'one input data' means a single or a set of input data which is unit of process target.

Next, 'execution scheme 2' is an execution scheme that a whole of program is executed on the host side. In the execution scheme 2, all of the input API, the calculation process A, the calculation process B and the output API are executed on the host side.

The execution scheme 2 is realized by neglecting the offload designation part of the program by using a general art such as a compiler. In the execution scheme 2, only resource of the host is used for one input data.

Finally, 'execution scheme 3' is an execution scheme that all of processes defined in the program are executed on the accelerator side. But, it is necessary that the host processor instructs the accelerator to start the process. In the execution scheme 3, all of the input API, the calculation process A, the calculation process B and the output API are executed on the accelerator side.

The execution scheme 3 is realized by converting the target program into the execution scheme specifying program 342 including the offload part which is not the offload designation part but a range from the input process API to the output process API with the conversion apparatus 310 using the general art. It is known that data transfer information, which is required to offload the range from the input process API to the output process API, is only the command line argument because of using the specified API. In the execution scheme 3, only the processor resource of the accelerator is used for one input. By changing designation of the accelerator which is an offload destination, it is possible to realize the execution scheme 3 also in the case that there are plural kinds of accelerator.

Figure 16:
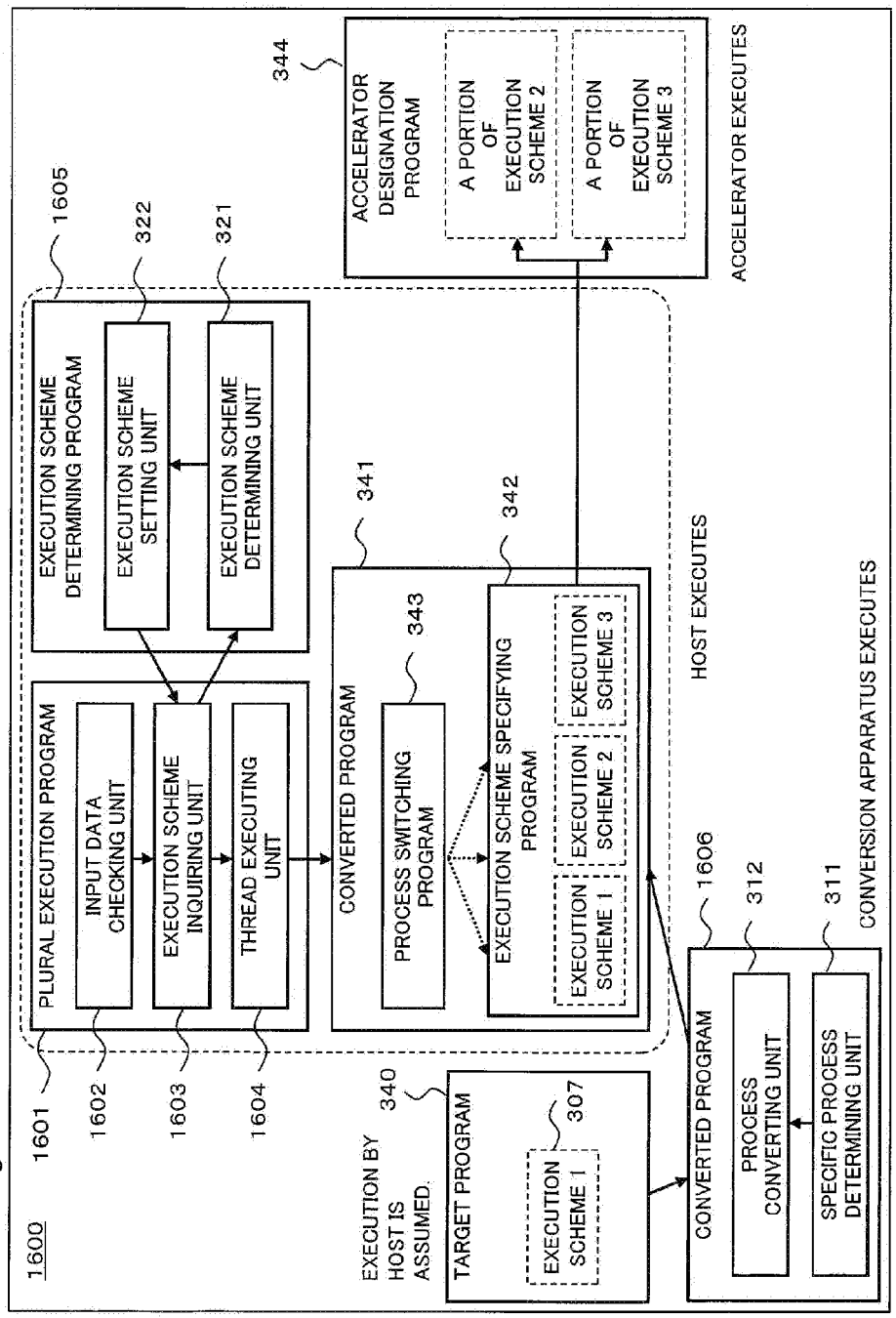
FIG. 16 is a block diagram showing composition of a program which is executed in the execution scheme parallel system of the seventh exemplary embodiment of the present invention.

FIG. 16 shows an example of composition of various programs 1600 (hereinafter, called 'program group') which are used in the execution scheme parallel system of the seventh exemplary embodiment, and relation among the programs which are included in the program group 1600.

6 programs which are included in the program group 1600 are classified into the following four categories.

1) Program which is Inputted as a Process Target

The target program 340 is a target program which is processed by the execution scheme parallel system. The target program 340 is a program in which the host processor 320 offloads based on the execution scheme 1 is assumed.

The target program 340 is inputted into the conversion apparatus 310 and is converted to the converted program 341.

2) Program which is Executed by the Conversion Apparatus 310

A conversion program 1606 is executed by the conversion apparatus 310, and converts the target program 340 into the converted program 341.

The conversion program 1606 includes the specific process determining unit 311 and the process converting unit 312. The specific process determining unit 311 and the process converting unit 312 are functions of software which converts the program.

The conversion apparatus 310 executes the conversion program 1606, and adds information on existence or non-existence of offload, or programs of the three kinds of execution scheme, whose forms are different each other, to generate the converted program 341. That is, the conversion apparatus 310 generates the converted program 341, which includes the execution scheme specifying programs 342 which are executed with the execution schemes 2 and 3 whose offload forms are different each other. The execution scheme specifying program 342 is executed by the host processor 320 and/or the accelerator 330.

Furthermore, the converted program 341 includes the process switching unit 343 which is realized by a conditional branch.

3) Program which is Executed by the Host Processor 320

The converted program 341, a plural execution program 1601 and an execution scheme determining program 1605, which are executed by the host processor 320, control a whole of offload in the execution scheme parallel system.

The execution scheme determining program 1605 includes the execution scheme determining unit 321 and the execution scheme setting unit 322. The execution scheme determining unit 321 and the execution scheme setting unit 322 are functions of the daemon thread.

The plural execution program 1601 includes input data checking unit 1602, execution scheme inquiring unit 1603 and thread executing unit 1604. The thread executing unit 1604 generates a thread by thread generating unit (not shown in the figure), which a general OS has, in order to execute the plural execution program 1601. Information exchange between the plural execution program 1601 and the execution scheme determining program 1605 is carried out through communication unit (not shown in the figure) which a general OS has.

The host processor 320 selects the execution scheme per input data by the plural execution program 1601 and the execution scheme determining program 1605. Then, the host processor 320 executes the program corresponding to the selected execution scheme among the execution scheme specifying programs 342 which are included in the converted program 341. In the case that the selected execution scheme is the scheme which the accelerator 330 uses, the host processor 320 makes the accelerator execute the accelerator designation program 344 which is the offload part to the accelerator 4) Program which is Executed by the Accelerator 330

The accelerator designation program 344 is a program which is offloaded by the host processor 320 and is executed by the accelerator 330.

Figure 17:
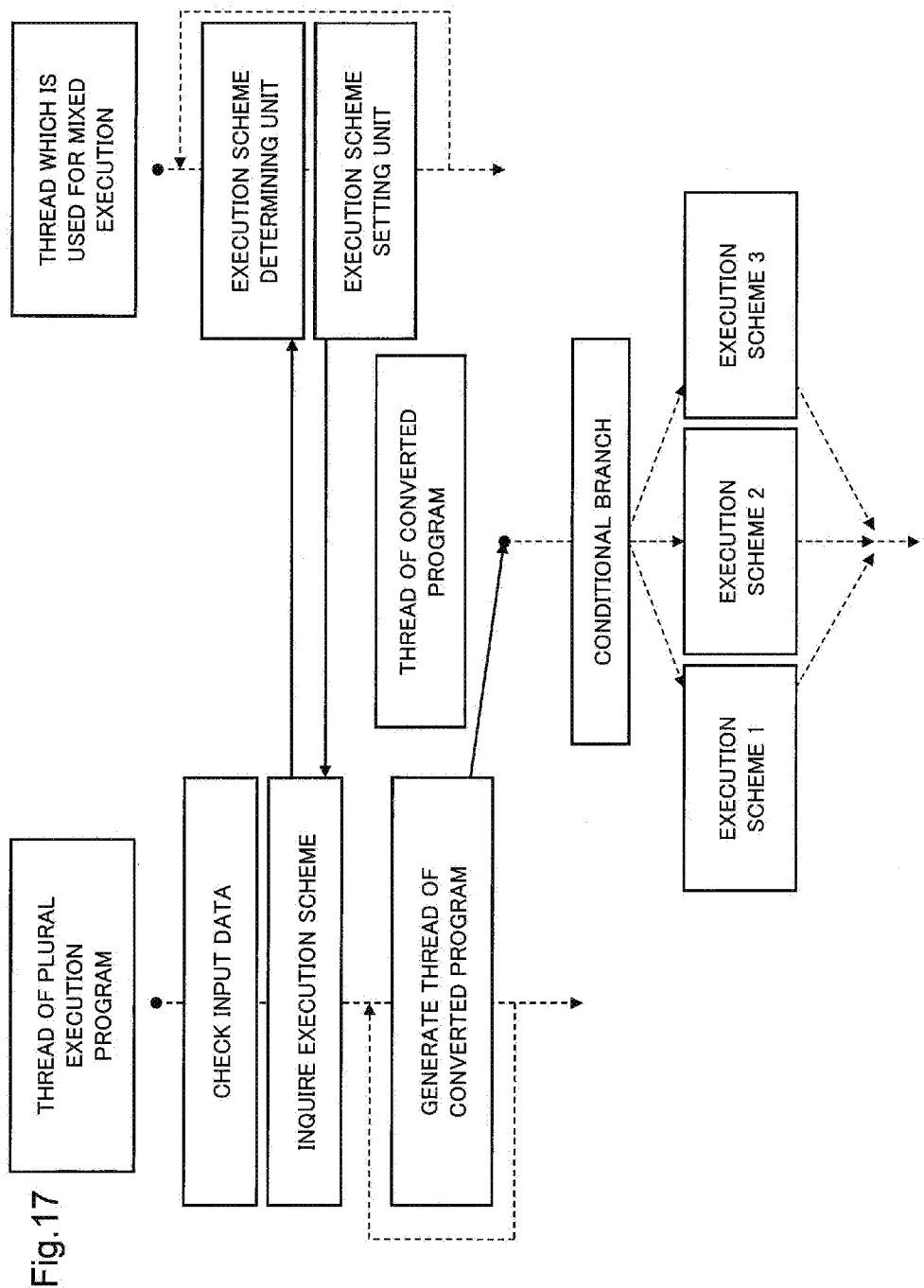
FIG. 17 is a diagram showing each unit which operates as a thread in a host processor in the seventh exemplary embodiment of the present invention.

Next, an operation of the execution scheme parallel system in the seventh exemplary embodiment will be described. FIG. 17 shows a status that each unit works as the thread in the host processor 320. An operation of each thread will be described later.

The operation of the execution scheme parallel system 1600 is divided into two phases of (1) phase to generate the converted program from the target program, and (2) phase to execute the converted program with changing the execution scheme.

(1) Phase to Generate the Converted Program from the Original Program

The converted program is generated from the target program by the specific process determining unit and the process converting unit.

The specific process determining unit 311 searches for positions of the input process API and the output process API of the target program in a program source, and notifies the process converting unit 312 of the positions of the input process API and the output process API (Step S401).

Based on a the positions of the input process API and the output process API of which the specific process determining unit 311 notifies, the process converting unit 312 sets the range from the input process API to the output process API as the offload enabling range. Then, the process converting unit 312 generates the execution scheme specifying programs 342, which are executed with the three kinds of execution schemes mentioned above, by copying the program within the offload enabling range and adding or deleting the offload starting API and the offload ending API.

Specifically, the execution scheme specifying program 342 of the execution scheme 1 is realized by deleting a program which ranges from a process just after the offload starting API to a process just before the offload ending API, that is, a program included in the offload enabling range with the process converting unit 312.

The execution scheme specifying program 342 of the execution scheme 2 is realized by using the target program as it is. Here, in the case of the execution scheme specifying program 342 of the execution scheme 2, offload is not carried out actually. But, in order to handle the execution scheme specifying program 342 of the execution scheme 2 similarly to ones of the other execution schemes, the execution scheme specifying program 342 of the execution scheme 2 is called the offload program.

In order to generate the execution scheme specifying program 342 of the execution scheme 3, firstly, the process converting unit 312 deletes the offload starting API and the offload ending API which are included in the offload enabling range. Next, in order to designate the range from the input process API to the output process API as the offload part, the process converting unit 312 designates data which the input process API requires, and adds the offload starting API just before the input process API. Furthermore, the process converting unit 312 designates data which the output process API outputs, and adds the offload ending API just after the output process API. By carrying out the above-mentioned process, the execution scheme 3 is realized.

Based on the target program 340, the converted program 341, which includes the three kinds of execution scheme of the execution scheme specifying programs 342 and the process switching unit 343 switching the three kinds of execution scheme with the conditional branch, is generated (Step S402). Here, a condition, which is related to the conditional branch, is notified by the execution scheme setting unit 321 through socket communication when executing the converted program 341.

(2) Phase to Execute the Converted Program with Switching the Execution Scheme

The plural execution program 1601, which includes the converted program 341, is executed while being switched the execution scheme by the execution scheme determining unit 321 and the execution scheme setting unit 322.

A thread of the plural execution program 1601 and a thread to execute the execution schemes in parallel enter into an execution state.

The plural execution program 1601 checks whether the input queue 1401 holds data. In the case that the input queue does not hold any data, the plural execution program 1601 enters into a waiting status until new data comes into the input queue 1401.

The execution scheme inquiring unit 1603 inquires to the execution scheme determining unit 321 about the thread to execute the execution schemes in parallel. The socket communication is used for the inquiry.

Firstly, based on parameters of the program and the system, the execution scheme determining unit 321 determines the allotment number of each execution scheme by use of the allotment number determining algorithm.

Next, the execution scheme determining unit 321 selects the execution scheme, whose number of input data, which are currently under execution, does not reach the allotment number which has been determined already, in an order of highness of priority of each execution scheme, and determines the selected execution scheme to be the execution scheme of the program for one input data. The allotment number determining algorithm will be described later.

The execution scheme setting unit 322 notifies the execution scheme inquiring unit 1603 of the execution scheme which the execution scheme determining unit 321 instructs. The socket communication is used for the notice.

The execution scheme inquiring unit 1603 sets the notified execution scheme as a variable number.

The thread executing unit 1604 generates the thread in order to execute the converted program 341 for one input data. When generating the thread, the thread executing unit 1604 provides the variable number, which is set by the execution scheme inquiring unit 1603, as the argument.

In the thread of the converted program 341, the offload program is executed based on the variable number of which is notified by the thread executing unit 1604 in a form of the argument and which indicates the execution scheme, and the execution scheme which is designated by the process switching unit 343 realized by the conditional branch.

In the seventh exemplary embodiment, allotment number of data to be processed is determined per the execution scheme by the execution scheme determining unit 321, and the execution scheme for each data is determined based on the allotment number of data. A flow of the allotment number determining algorithm will be described in the following.

Figure 18:
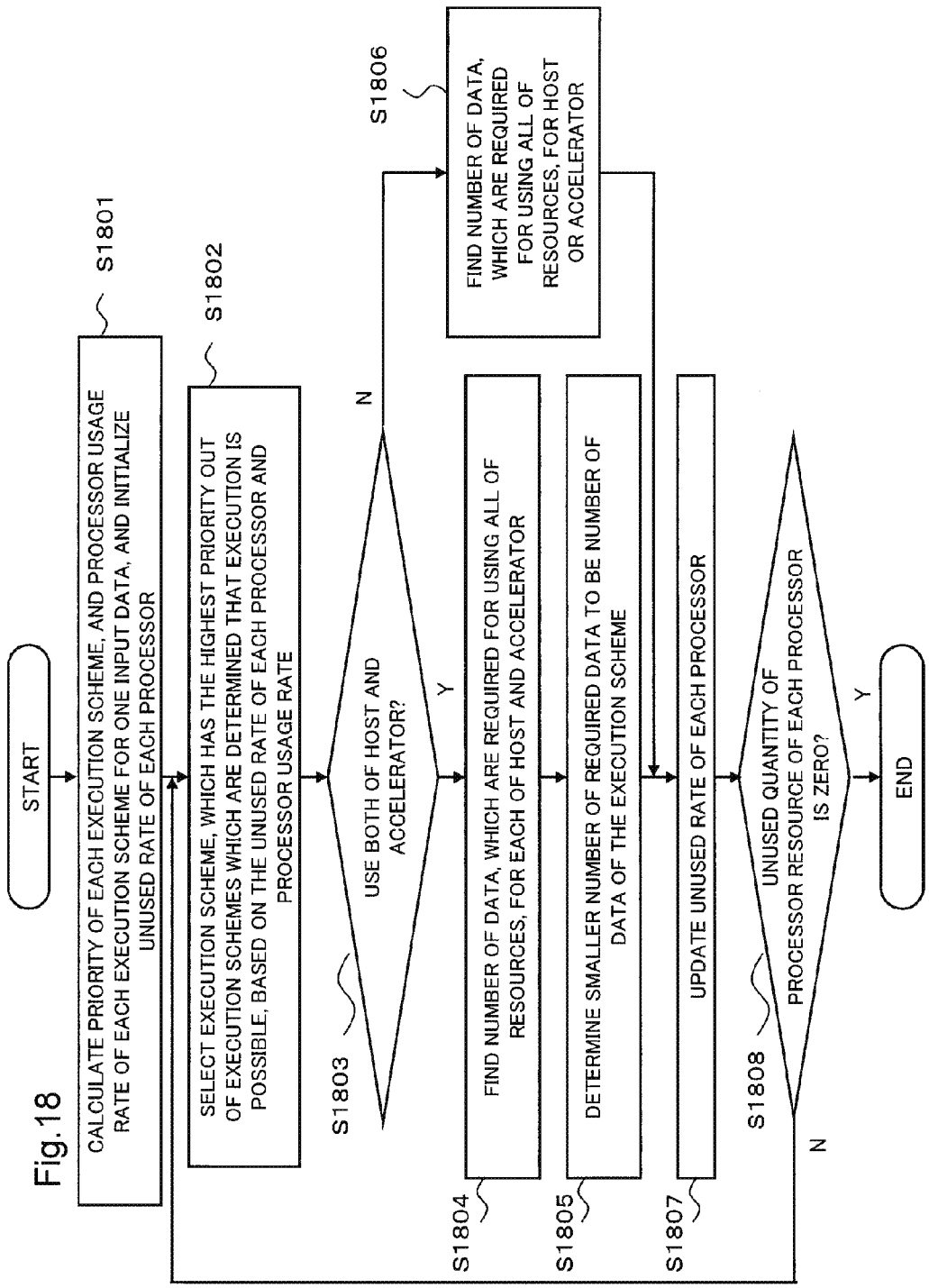
FIG. 18 is a flowchart showing a process flow of an allotment number determining algorithm in the seventh exemplary embodiment of the present invention.
Figure 19:
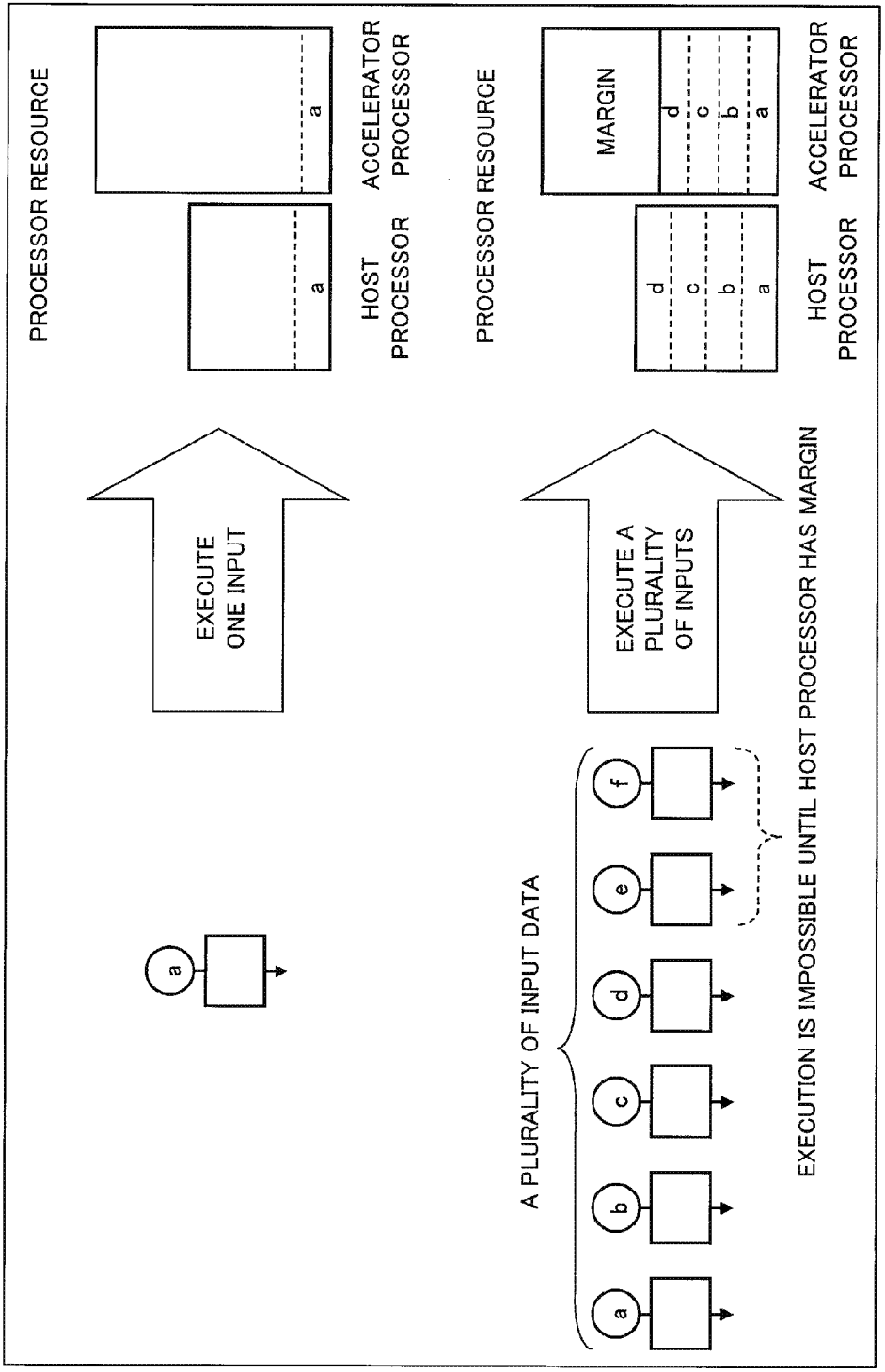
FIG. 19 is a diagram exemplifying a parallel operation in which a resource of a processor is left.

FIG. 18 is a flowchart showing a process flow of the algorithm.

The execution scheme determining unit 321 sets priority to each execution scheme in an order of smallness of latency, and all of the unused rate of each processor resource is set to be 100% (Step S1801).

In the seventh exemplary embodiment, the priority is set in the order of smallness of latency of the execution scheme. Since it is conceivable that it is possible to almost neglect a time which is required for transferring data, it is assumed that latency of each execution scheme is acquired by adding latency of the calculation process A which carries out the scalar operation and whose execution time occupies 40% of the execution time of the whole program, and latency of the calculation process B which carries out the vector operation and whose execution time occupies 60% of the execution time of the whole program. Here, with respect to the scalar operation process, a ratio of performance of the host processor 320 to performance of the accelerator 330 is 4 to 1. Moreover, with respect to the vector operation process, the ratio of performance of the host processor 320 to performance of the accelerator 330 is 1 to 2.

In the seventh exemplary embodiment, 'latency' of one execution scheme is defined as a ratio of an execution time which is required when process a program, which processes one input data, with the execution scheme to an execution time which is required when the host processes a whole of the program. At this time, in the case of the execution scheme 1, an execution time of the host is 0.4 which is acquired by calculating 0.4÷1.0, and an execution time of the accelerator is 0.3 which is acquired by calculating 0.6÷2.0. Then, latency of the execution scheme 1 is 0.7 which is acquired by adding 0.4+0.3.

The latency of the execution scheme 2 is 1.0 since the host processor 320 carries out all of processes.

The latency of the execution scheme 3 is 1.9 by calculating 0.4÷0.25+0.6÷2.0.

Therefore, the priority is high in an order of the execution scheme 1, the execution scheme 2 and the execution scheme 3.

Next, the execution scheme determining unit 321 selects the execution scheme holding the highest priority among the execution schemes which do not use the program in which the unused rate of the processor resource is zero, that is, the program in which all processor resource is used (Step S1802). Since the unused rates of the host and the accelerator are 100% in this case, all of the execution scheme 1 to the execution scheme 3 are the target of selection. Since the execution scheme 1 has the highest priority among these execution schemes, the execution scheme determining unit 321 selects the execution scheme 1.

The execution scheme determining unit 321 determines whether the selected execution scheme is the execution scheme, which uses both of the processor resource of the host and the processor resource of the accelerator (Step S1803). In the case of the execution scheme which uses both, the procedure advances to Step S1804, and in the case of the execution scheme which uses either, the procedure advances to Step S1806. Since the execution scheme 1 uses the processor resources of the host and the accelerator, the procedure advance to Step S1804.

The execution scheme determining unit 321 finds number of input data for which the processor resource of each of the host and the accelerator is used efficiently (Step S1804). Since the host and the accelerator are used in the case of the execution scheme 1, the execution scheme determining unit 321 finds number of input data (hereinafter, called 'number of required data') for which the processor resource of each of the host and the accelerator is used efficiently. The number of input data is found by calculating (number of input data to be processed by one core per unit time)× (number of cores).

Here, it is assumed that 'unit time' is a process time required in the case that the host executes whole of the program.

In the execution scheme 1, since the host executes the scalar operation which occupies 40% of the program, one core can process 1÷0.4=2.5 data per the unit time. In the seventh exemplary embodiment, since number of built-in cores of the host is 8, number of required data, for which the processor resource of the host is used efficiently, is 2.5× 8=20.

Next, in the execution scheme 1, since the accelerator executes the vector operation which occupies 60% of the program, one core can process 1.0÷(0.6÷2)=3.33 data per the unit time. Since number of cores is 40, number of required data, for which the processor resource of the accelerator is used efficiently, is 3.33×40=133.33 data.

The execution scheme determining unit 321 determines smaller number of required data among the number of require data for which the unused processor resource of the host is used efficiently as number of data of the execution scheme (Step S1805). Since it is determined based on the result which is acquired in Step S1804 that the smaller number of required data is 20 for the host, it is determined that the execution scheme 1 processes 20 input data.

The execution scheme determining unit 321 updates the number of unused processor resources of each computer (Step S1807). In the case of the execution scheme 1, since all processor resource of the host is used efficiently by process the 20 data, the number of unused processor resource of the host becomes zero. Since 133.33 data are required in order to use the accelerator efficiently, the usage quantity of the processor resource of the accelerator is 15% which is acquired by calculating 20÷133.33. Based on the above mention, the unused quantity of the processor resource of the host is updated to 0%, and the unused quantity of the processor resource of the accelerator is updated to 85%.

In the case that all of the unused quantity of the processor resource of each computer is zero, the data number determining flow is ended, and in the case of not zero, the procedure advances to Step S1802 (Step S1808). Taking the above-mentioned result into consideration, since the unused quantity of the processor resource of the accelerator is not zero, the procedure advance to Step S1802.

In Step S1802, since the computer, whose the unused quantity of the processor resource is not zero is only the accelerator, the execution scheme 3, in which all of the processes are executed by the accelerator, is selected In Step S1803, since the execution scheme 3 uses only the accelerator, the procedure advances to Step S1806.

The execution scheme determining unit 321 determines number of required data in order to use efficiently the program which should be used, that is, the processor resource of the accelerator in this case.

In the execution scheme 3, number of required data for which all processor resource of the accelerator is used efficiently is 21.05 based on a calculation of 1.0÷1.9×40. Since the unused quantity of the processor resources is 85%, number of data which can be processed by excessive processor resource of the accelerator is determined to be 17.9 data which is acquire by calculating 21.05×0.85. When the number of required data is determined, the procedure advances to Step S1807.

In Step S1807, since the processor resource of the accelerator is used efficiently by process 17.9 data with the execution scheme 3, number of unused processor resources of the accelerator becomes zero.

By carrying out the above-mentioned process, both the unused quantity of the processor resources of the host and the accelerator become zero, and then the execution scheme allotment number algorism is ended.

Based on the result mentioned above, it is determined that number of processed data in the case of the execution scheme 1 is 20, and number of processed data in the case of the execution scheme 2 is 0, and number of processed data in the case of the execution scheme 3 is 17.9. As mentioned above, in the seventh exemplary embodiment, it is possible to process 37.9 input data by using all processor resource.

An effect of the seventh exemplary embodiment will be described in the following. In the seventh exemplary embodiment, the computer system can prepare the plural execution schemes by converting the program as shown in FIG. 17, and can switch the execution schemes per the input data. While the computer system processes only 20 data per the unit time in the case of the execution scheme 1 which is the execution scheme in the usual offload, the computer system of the seventh exemplary embodiment can process 37.9 data per the unit time since it is possible to use the unused processor resource of the accelerator efficiently by determining the allotment number. As mentioned above, the computer system of the seventh exemplary embodiment has an effect that it is possible to enhance throughput of the system greatly.

Here, an instruction statement, such as a pragma, which indicates the offload starting position and the offload ending position, may be embedded in the program in some cases. In the case of searching for and finding out the instruction statement in the program, the position of the instruction statement may be conceived to be the offload starting position and the offload ending position.

In the exemplary embodiment according to the present invention, the host processor and the accelerator are exemplified as the plural processor. Moreover, it is assumed that each of the host processor and the accelerator includes a plurality of built-in CPU cores. Moreover, it is assumed that the host processor and the accelerator are good at the scalar operation and the vector operation respectively. On the other hand, the present invention has no limitation in architecture, number of built-in CPUs, an applied application of the plural processor.

As understood from the explanation on each exemplary embodiment, it is enough if the processor satisfies the following condition.

1) Number of processors is not smaller than 2.

Since a target of the present invention is a system which offloads a whole of or a portion of a program, a plurality of processors are required.

2) Each processor holds a resource which influences performance related to a predetermined process.

By selecting one of offloading and not offloading a whole of or a portion of the program, the present invention makes the unused resource zero to the utmost, and enhances performance of the whole system. Therefore, each processor has the resource whose process performance (such as a CPU usage time, a plurality of CPU cores, or the like) of the whole system is changed according to being used or not being used.

3) Architecture of each processor is optional.

The application, the calculation process and the like, which is suitable to the processor, that is, to which the processor can provide the highest performance, are different in some cases by a difference of architecture. However, it is enough if the processor can process the offload part. Therefore, internal structure and a process scheme of the processor are optional.

4) Number of built-in CPU cores of each processor is not smaller than 1.

In the present invention, the unused quantity of the resource of each processor is taken into consideration. But, even in the case that the processor includes only one CPU core, it is possible to define the unused resource as an execution time of CPU or the like. Therefore, number of the built-in CPU cores is optional.

Here, each kinds of the programs in the description may be stored in a semiconductor storage device such as Read Only Memory (ROM), Random Access Memory (RAM), a flash memory or the like, and a non-transitory medium such as an optical disc, a magnetic disc, an optical magnetic disc or the like.

Moreover, it is possible to combine the above-mentioned exemplary embodiment with the other exemplary embodiment.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2012-142901, filed on Jun. 26, 2014, the disclosure of which is incorporated herein in its entirety by reference.

INDUSTRIAL APPLICABILITY

The present invention is applicable to a system in which a server with a sub processor realizes a service such as image monitoring, image conversion, picture image, financial process or the like. Moreover, the present invention is also applicable to a case that a system, which includes a cluster whose computers have performance values different each other, realizes an application which finds a result by carrying out a predetermined process per an input and to which an offload part is designated.

REFERENCE SIGNS LIST

1600 program group

The invention claimed is:

1. A program conversion device, comprising:
  a memory;
  a processor;
  storing a specific process determining unit in the memory which determines a range of a partial program to perform a specific process in a target program which includes a first execution scheme specifying program which executes in parallel with a first ratio of being a usage ratio of a first usage quantity with respect to a first resource of a first processor and a second usage quantity with respect to a second resource of a second processor; and
  storing a process converting unit in the memory which converts the partial program into a second execution scheme specifying program by the processor in which the first processor and the second processor operate simultaneously with a second ratio of being the usage ratio different from the first ratio and generating a converted program, wherein the converted program includes a process switching program which switches from the first execution scheme specifying program to the second execution scheme specifying program and vice versa based on a command from outside.

2. The program conversion device according to claim 1, wherein the converted program further includes the first execution scheme specifying program, the second execution scheme specifying program.

3. A program converting method, comprising:
  determining a range of a partial program to perform a specific process in a target program which includes a first execution scheme specifying program which executes in parallel with a first ratio of being a usage ratio of a first usage quantity with respect to a first resource of a first processor and a second usage quantity with respect to a second resource of a second processor; and converting the partial program into a second execution scheme specifying program which executes in parallel with a second ratio of being the usage ratio different from the first ratio, wherein the converted program includes a process switching program which switches from the first execution scheme specifying program to the second execution scheme specifying program and vice versa based on a command from outside.

4. A process switching method, comprising:

switching from a first process unit to a second process unit and vice versa as specified in a converted partial program based on a command from outside, wherein the first process unit operates based on a first execution scheme which executes in parallel with a first ratio of being a usage ratio of a first usage quantity with respect to a first resource of a first processor and a second usage quantity with respect to a second resource of a second processor, and the second process unit operates based on a second execution scheme which executes in parallel with a second ratio of being the usage ratio different from the first ratio.

5. A non-transitory storage medium storing an execution scheme determining program which makes a first processor operate as a first process unit which operates based on a first execution scheme which executes in parallel with a first ratio of being a usage ratio of a first usage quantity with respect to a first resource of a first processor and a second usage quantity with respect to a second resource of a second processor, a second process unit which operates based on a second execution scheme which executes in parallel with a second ratio of being the usage ratio different from the first ratio, and a process switch unit which switches from the first process unit to the second process unit and vice versa as specified in a converted partial program based on a command from outside.

6. A method of determining execution scheme, comprising:

selecting any one of a first execution scheme which executes in parallel with a first ratio of being a usage ratio of a first usage quantity with respect to a first resource of a first processor and a second usage quantity with respect to a second resource of a second processor, and a second execution scheme which executes in parallel with a second ratio of being the usage ratio different from the first ratio;

setting the first execution scheme or the second execution scheme based on the selection result; and a process switching program which switches from the first execution scheme specifying program to the second execution scheme specifying program and vice versa based on a command from outside.

7. The method of determining execution scheme according to claim 6, wherein any one of the first execution scheme and the second execution scheme is selected so that a unused quantity of the first resource and the second resource become small.

8. The method of determining execution scheme according to 6 or 7, wherein applying the first execution scheme to input data which have number of first allotment, and applying the second execution scheme to input data which have number of second allotment.

9. The method of determining execution scheme according to claim 8, wherein determining the number of first allotment and the number of second allotment respectively based on a priority of the first execution scheme and the second execution scheme.

10. The method of determining execution scheme according to claim 8 or 9, further comprising:

measuring performance when the number of first allotment and the number of second allotment are changed and determining the number of first allotment and the number of second allotment based on a the performance, wherein any one of the first execution scheme and the second execution scheme is selected based on the determined number of allotment.

11. A non-transitory storage medium storing a program which makes a first processor operate as a execution scheme determining unit which selects, as execution scheme to executing a specific program, any one of a first execution scheme which executes in parallel with a first ratio of being a usage ratio of a first usage quantity with respect to a first resource of a first processor and a second usage quantity with respect to a second resource of a second processor, and a second execution scheme which executes in parallel with a second ratio of being the usage ratio different from the first ratio, a execution scheme setting unit which sets the first execution scheme or the second execution scheme based on the selection result; and a process switching program which switches from the first execution scheme specifying program to the second execution scheme specifying program and vice versa based on a command from outside.

12. A processor system, comprising:

a first processor which includes a first resource; and a second processor which includes a second resource, wherein the first processor operates as a process switch unit which switches from a first process unit to a second process unit and vice versa as specified in a converted partial program based on a command from outside, the first process unit operates based on a first execution scheme which executes in parallel with a first ratio of being a usage ratio of a first usage quantity with respect to a first resource of a first processor and a second usage quantity with respect to a second resource of a second processor, and the second process unit operates based on a second execution scheme which executes in parallel with a second ratio of being the usage ratio different from the first ratio, and a first partial process unit which utilizes the first resource of the first process unit and the second process unit.

13. The processor system according to claim 12, wherein the second processor operates as second partial process unit for utilizing the second resource of the first process unit and the second process unit.

14. A parallel execution method, comprising:

by a first processor, switching from a first process unit to a second process unit and vice versa as specified in a converted partial program based on a command from outside, the first process unit operates based on a first execution scheme which executes in parallel with a first ratio of being a usage ratio of a first usage quantity with respect to a first resource of a first processor and a second usage quantity with respect to a second resource of a second processor, and the second process unit operates based on a second execution scheme which executes in parallel with a second ratio of being the usage ratio different from the first ratio, and operating as a first partial process unit which utilizes the first resource of the first process unit and the second process unit; and by the second processor, operating as a second partial process unit which utilizes the second resource of the first process unit and the second process unit.

* * * * *